United States Patent
Voet et al.

(10) Patent No.: US 9,463,678 B2
(45) Date of Patent: Oct. 11, 2016

(54) SYSTEM FOR REDUCING ROLL AND PITCH IN A MOVING VEHICLE

(71) Applicant: FLOOR MASTER, Hulshout (BE)

(72) Inventors: Hans Voet, Hulshout (BE); Pascal Degezelle, Langdorp (BE)

(73) Assignee: FLOOR MASTER, Hulshout (BE)

( * ) Notice: Subject to any disclaimer, the term of this patent is extended or adjusted under 35 U.S.C. 154(b) by 0 days.

(21) Appl. No.: 14/373,987

(22) PCT Filed: Feb. 15, 2013

(86) PCT No.: PCT/EP2013/053129
§ 371 (c)(1),
(2) Date: Jul. 23, 2014

(87) PCT Pub. No.: WO2013/121022
PCT Pub. Date: Aug. 22, 2013

(65) Prior Publication Data
US 2015/0039184 A1 Feb. 5, 2015

(30) Foreign Application Priority Data
Feb. 15, 2012 (EP) .................................... 12155657

(51) Int. Cl.
*B60G 17/0165* (2006.01)
(52) U.S. Cl.
CPC ..... *B60G 17/0165* (2013.01); *B60G 2300/022* (2013.01); *B60G 2400/82* (2013.01)
(58) Field of Classification Search
CPC .......... B60G 17/0165; B60G 2400/82; B60G 2300/022
USPC .......................................................... 701/38
See application file for complete search history.

(56) References Cited

U.S. PATENT DOCUMENTS

| 5,347,457 | A  |   | 9/1994  | Tanaka et al. |
| 6,268,825 | B1 | * | 7/2001  | Okada ..................... B60T 8/172 342/357.52 |
| 6,904,350 | B2 | * | 6/2005  | Lu ....................... B60G 17/0162 701/38 |
| 7,136,731 | B2 | * | 11/2006 | Lu ....................... B60R 16/0233 701/38 |
| 7,676,307 | B2 | * | 3/2010  | Schmitt .................. B60T 8/172 701/38 |

(Continued)

FOREIGN PATENT DOCUMENTS

| DE | 10 157 426 A1    | 6/2003 |
| DE | 10 2006 001 436 A1 | 7/2007 |

(Continued)

OTHER PUBLICATIONS

International Search Report for PCT/EP2013/053129 dated Jul. 19, 2013 (PCT/ISA/210).

*Primary Examiner* — Atul Trivedi
(74) *Attorney, Agent, or Firm* — Sughrue Mion, PLLC

(57) ABSTRACT

A vehicle is disclosed designed for traveling on a traveling surface. The vehicle comprises a detection means for detecting irregularities in the traveling surface. From the detected irregularities in the traveling surface a first kinematic effect is calculated that is being exerted, or about to be exerted, on a support wheel of the vehicle. The vehicle further comprises an actuator that exerts a second kinematic effect on the support wheel. The second kinematic effect is identical or similar in magnitude to the first kinematic effect, and opposite in sign. The vehicle can be any vehicle, in particular an industrial vehicle, more particularly a vehicle that can be extended to a height exceeding its wheelbase.

17 Claims, 16 Drawing Sheets

(56) References Cited

U.S. PATENT DOCUMENTS

| | | | | |
|---|---|---|---|---|
| 8,005,591 B2* | 8/2011 | Poilbout | B60G 17/0165 | 280/5.506 |
| 8,112,199 B2* | 2/2012 | Poilbout | B60G 3/04 | 280/5.5 |
| 8,321,088 B2* | 11/2012 | Brown | B60T 8/17552 | 180/271 |
| 2003/0182025 A1* | 9/2003 | Tseng | B60G 17/0162 | 701/1 |
| 2004/0019418 A1* | 1/2004 | Lu | B60G 17/0162 | 701/38 |
| 2004/0162654 A1* | 8/2004 | Lu | B60G 17/0162 | 701/38 |
| 2005/0131604 A1* | 6/2005 | Lu | B60G 17/0162 | 701/38 |
| 2005/0149240 A1* | 7/2005 | Tseng | B60G 17/016 | 701/38 |
| 2005/0206229 A1* | 9/2005 | Lu | B60T 7/20 | 303/123 |
| 2005/0242241 A1* | 11/2005 | Peck | B64G 1/285 | 244/165 |
| 2006/0085112 A1* | 4/2006 | Lu | B60R 21/0132 | 701/38 |
| 2008/0059021 A1* | 3/2008 | Lu | B60G 17/0195 | 701/36 |
| 2008/0059034 A1* | 3/2008 | Lu | B60T 8/17552 | 701/71 |
| 2008/0082246 A1* | 4/2008 | Brown | B60T 8/17552 | 701/91 |
| 2008/0086248 A1* | 4/2008 | Lu | G05D 1/0891 | 701/41 |
| 2008/0086251 A1* | 4/2008 | Lu | B60T 8/1755 | 701/70 |
| 2008/0119984 A1* | 5/2008 | Hrovat | B60G 17/0162 | 701/38 |
| 2008/0243334 A1 | 10/2008 | Bujak et al. | | |
| 2008/0319609 A1* | 12/2008 | Poilbout | B60G 3/04 | 701/38 |
| 2009/0024277 A1* | 1/2009 | Poilbout | B60G 3/04 | 701/38 |
| 2009/0037050 A1* | 2/2009 | Lu et al. | B60T 8/172 | 701/38 |
| 2009/0062984 A1* | 3/2009 | Poilbout | B60G 17/0161 | 701/37 |
| 2010/0228422 A1 | 9/2010 | Gartner et al. | | |
| 2011/0208391 A1* | 8/2011 | Mizuta | B60G 17/015 | 701/37 |
| 2015/0224845 A1* | 8/2015 | Anderson | B60G 17/019 | 701/37 |

FOREIGN PATENT DOCUMENTS

| | | |
|---|---|---|
| EP | 1 449 688 A2 | 8/2004 |
| EP | 1 449 688 A3 | 2/2006 |
| EP | 2 022 655 A1 | 2/2009 |
| JP | 6-24233 A | 2/1994 |
| WO | 2005/014315 A1 | 2/2005 |
| WO | 2009/063958 A1 | 5/2009 |

* cited by examiner $z_{FL} = f(x)$ $\dot{z}_{FL} = f'(x)\dot{x}$ $\ddot{z}_{FL} = f''(x)\dot{x}^2 + f'(x)\ddot{x}$ $\dot{x} = \dfrac{dx}{dt}$ $\ddot{x} = \dfrac{d^2x}{dt^2}$ $f'(x) = \dfrac{df}{dx}$ $f''(x) = \dfrac{d^2f}{dx^2}$

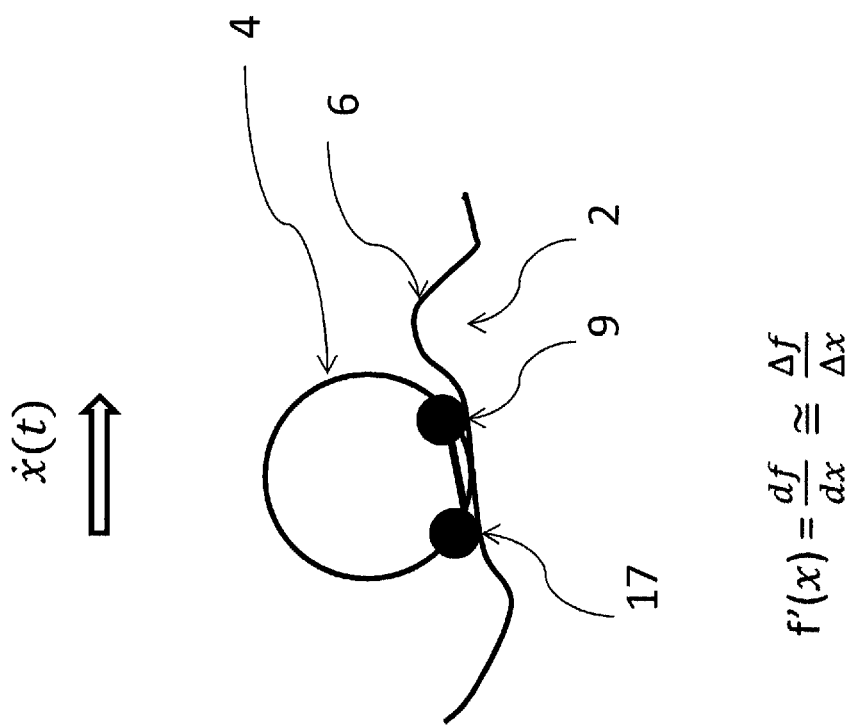

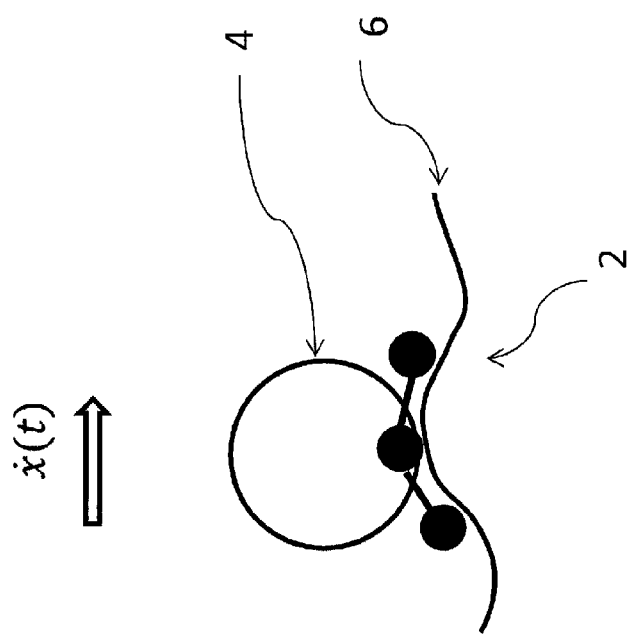

SYSTEM FOR REDUCING ROLL AND PITCH IN A MOVING VEHICLE

CROSS REFERENCE TO RELATED APPLICATIONS

This application is a National Stage of International Application No. PCT/EP2013/053129 filed Feb. 15, 2013, claiming priority based on European Patent Application No. 12155657.5 filed Feb. 15, 2012, the contents of all of which are incorporated herein by reference in their entirety.

BACKGROUND OF THE INVENTION

1. Field of the Invention

The invention relates generally to a vehicle, in particular an industrial vehicle and more particularly to a vehicle comprising a system for reducing roll and/or pitch movement of the vehicle when the vehicle is traveling over a surface having surface unevenness.

The invention also relates to a method for reducing roll and/or pitch movement of a vehicle traveling on a surface having surface unevenness.

2. Description of the Related Art

As travel surfaces are never perfectly smooth, a traveling vehicle unavoidably encounters unevenness, which causes back-and-forth movement of the vehicle body ("pitch") and a sideways rocking motion of the vehicle body ("roll" or "body roll"). These motions are a cause of discomfort to passengers traveling in the vehicle, as well as a safety concern, as these motions tend to reduce the grip of the wheels onto the traveling surface.

Even very early incarnations of the automobile had some provision for reducing the body motions of the traveling vehicle. For some time leaf springs, adopted from horse drawn carriages, were used for this purpose.

Since decades, motor vehicles, such as cars, vans and trucks, have been provided with a combination of springs and shock absorbers ("dampers"). The springs soften the transmission of wheel movements to the vehicle body; the shock absorbers dampen the sinusoidal motion of the springs. Mechanically the use of springs splits the vehicle in an "unsprung" portion (basically, the wheels) and a "sprung" portion (basically the rest of the vehicle). It has long been recognized that the body motions of the vehicle can be reduced by reducing the weight of the unsprung portion of the vehicle relative to the sprung portion. This insight has led to the use of pneumatic tires and light weight alloy wheel rims as weight-reducing measures. In addition, the use of rubber tires, in particular pneumatic tires, imparts a certain measure of "springiness" to the wheels, so that the wheels are not fully "unsprung."

The characteristics of the springs and the shock absorbers represent a compromise between passenger comfort on the one hand, and handling of the vehicle on the other. Depending on the target demographics a car manufacturer may tune the suspension of the vehicle to favor comfort or handling. Certain upscale models permit the operator of the vehicle to choose between two or more pre-set suspension tunings. For example, the operator of the vehicle may select a stiff suspension tuning for sport driving, and a more moderate tuning for long distance driving and/or poor road conditions.

Systems have been proposed for adjusting the tuning of the suspension of a road vehicle in response to a detected unevenness in the road surface. U.S. Pat. No. 5,347,457 to Tanaka et al. discloses a vehicle equipped with a sensor at the front of the vehicle. The sensor registers an unevenness, such as a protuberance, in the road surface. The vehicle has springs and dampers of which the rigidity can be adjusted. A controller changes the rigidity of the spring and the damper of a specific wheel at the time the particular wheel reaches the protuberance in the road surface.

Likewise, JP 6-024233 to Nissan Motor discloses a vehicle with a sensing means for sensing a road surface ahead of the wheels. When an unevenness is detected, a controller excites the sub-sprung motion part into a vibration in a phase matching that of the unevenness detected in the road surface.

WO 2005/014315 A1 to Continental Aktiengesellschaft discloses shock absorbers that are adjusted to pavement conditions. The pavement conditions are registered by a sensor placed at the front end of the vehicle.

In an alternate approach the position of a wheel relative to the vehicle body is changed in anticipation of the wheel's encountering a bump or a hole in the road surface. As a result the wheel's vertical motion, necessary for dealing with the hole or bump, is not shared by the vehicle body.

This is the approach underlying the system disclosed in DE 101 57 426 A1 to Brötz. This reference discloses a vehicle in which each wheel has a dedicated sensor for determining bumps and recesses in the road surface in front of the wheel. The vehicle has means for individually raising each wheel when it encounters a bump, and for lowering each wheel when it encounters a recess.

EP 1 449 688 A2 to Bose Corporation discloses an active suspension system for a vehicle, including elements for developing and executing a trajectory plan responsive to the path on which the vehicle is traveling. Road surface information may be stored in memory on board the vehicle, or may be obtained wirelessly from an external database. The location of the vehicle is determined by use of a global positioning system, by dead reckoning, or a combination of the two.

A different approach is disclosed in DE 39 30 517 A1 to Robert Bosch GmbH. This reference discloses a vehicle with three sensors associated with each wheel. The sensors monitor, respectively, the damper force, the distance between the wheel and the vehicle body, and the (vertical) acceleration of the wheel. These three inputs are used to calculate a road surface unevenness velocity, which is input to the controller as a disturbance quantity. The calculation requires two time integrations and the estimation of three system parameters: suspension stiffness, tire stiffness and wheel mass.

Industrial vehicles, such as fork lift trucks, present a unique set of challenges with respect to controlling pitch and roll motions. Such vehicles generally travel on concrete floors that are, compared to highways, relatively smooth. In addition, such vehicles travel at relatively low speed, for example up to 12 km/hr.

Nevertheless, even such concrete floors inevitably present surface unevenness, often in the form of undulations. Fork lift trucks carry heavy loads, often at great heights, for example up to 17 meters. In addition, fork lift trucks such as "Narrow Aisle" trucks and "Very Narrow Aisle" trucks operate in tight spaces between tall storage racks, leaving little room for lateral movement. There is a compelling economic need to operate these trucks at as high a speed as possible, to reduce the time for loading and unloading to the minimum necessary or to maximize the number of pallet picks per unit of time.

These factors combine to a compelling need for providing a system for reducing roll and pitch motion of a moving vehicle that is particularly suitable for industrial vehicles, such as fork lift trucks.

Methods for avoiding roll and/or pitch movement of an industrial vehicle when the vehicle is traveling over an undulating floor are known to the person skilled in the art. U.S. Pat. No. 3,937,339 for example describes such a method wherein the industrial vehicle is an outdoor lifting vehicle and comprises a chassis with four supporting wheels for supporting the vehicle on the floor at a supporting location along a supporting path of the outdoor undulating floor. The vehicle comprises a sensor for sensing undulations in the floor in the supporting path of the supporting wheel while traveling over the undulating floor, and roll and/or pitch compensation means for compensating the roll and/or pitch movement of the vehicle caused by the undulations in the floor. The sensor is in the form of an electric circuit with level sensing means responsive to the transverse orientation of the vehicle. The roll and/or pitch compensation means for compensating the roll and/or pitch movement of the vehicle caused by the undulations in the floor is in the form of hydraulics controlling the position of the vehicle supporting wheels with respect to the chassis of the vehicle. It is the aim of the method to keep the vehicle, more in particular the chassis of the vehicle, as level as possible.

However, the electric circuit is only provided for sensing the transverse orientation of the vehicle at the supporting locations of the supporting wheels of the vehicle. Therefore, future roll and/or pitch movements of the vehicle cannot be taken into account and therefore a sufficient avoidance of roll and/or pitch movements of the vehicle can only be obtained when the vehicle is either driving relatively slow or when it is stationary. It is however often required that industrial vehicles drive at higher speeds. Moreover, it has been found that rolling movement causes, especially at higher speeds of the vehicle, the vehicle load to move transversally and can even cause the load lifted by the vehicle to move according to an eigenfrequency, which can even be dangerous as it may cause the load, or even the vehicle, to tip over, which is much undesired.

Thus, there is a particular need for a system for reducing roll and pitch in a moving vehicle responsive to actual and predicted pitch and roll motions of the vehicle.

There is a further need for such a system requiring a minimum number of sensors and a minimum amount of computing power.

There is still a further need for such a system suitable for vehicles having a rigid connection between the wheels and the chassis.

BRIEF SUMMARY OF THE INVENTION

The present invention addresses these problems by providing a vehicle comprising a chassis; at least one wheel in contact with a traveling surface; a detection means for detecting a surface characteristic of the traveling surface; data processing means for calculating from the surface characteristic a first kinematic effect being exerted or about to be exerted on the at least one wheel by the traveling surface; an actuator for exerting a second kinematic effect on the at least one wheel, said second kinematic effect being designed to counteract the first kinematic effect.

The first kinematic effect can be, for example, a velocity or an acceleration of the wheel, more specifically a vertical component of such velocity or acceleration.

The second kinematic effect is designed to counteract the first kinematic effect. Thus, if the data processing means predicts an upward velocity of the wheel $V_w$, the actuator responds by imparting to the wheel a velocity $-V_w$, that is, a velocity of equal magnitude but opposite in sign (i.e., downward). Likewise, if the processing means predicts an upward acceleration of the wheel $a_w$, the actuator responds by imparting to the wheel a downward acceleration $-a_w$.

It is convenient for the sensor to register a surface characteristic of the traveling surface that is a first derivative or a second derivative of a vertical profile of the traveling surface. Providing a first derivative or a second derivative of a vertical profile of the traveling surface to the data processing means, as contrasted with providing a vertical profile of the traveling surface to the data processing means, significantly reduces the computing power required for calculating the first kinematic effect.

Another aspect of the invention comprises a method for reducing roll and pitch in a moving vehicle. The vehicle comprises a chassis; at least one wheel in contact with a traveling surface, and a detection means for detecting a surface characteristic of the traveling surface. According to the method of the invention a data processing means calculates from the surface characteristic a first kinematic effect being exerted or about to be exerted on the at least one wheel by the traveling surface. The actuator exerts a second kinematic effect on the at least one wheel, which is designed to counteract the first kinematic effect.

BRIEF DESCRIPTION OF THE DRAWINGS

The features and advantages of the invention will be appreciated upon reference to the following drawings, in which:

FIG. 6B shows a method for approximating first derivative f'(x) of function f(x).

FIG. 6C shows a method for approximating second derivative f''(x) of function f(x).

DETAILED DESCRIPTION OF THE INVENTION

Figure 1:
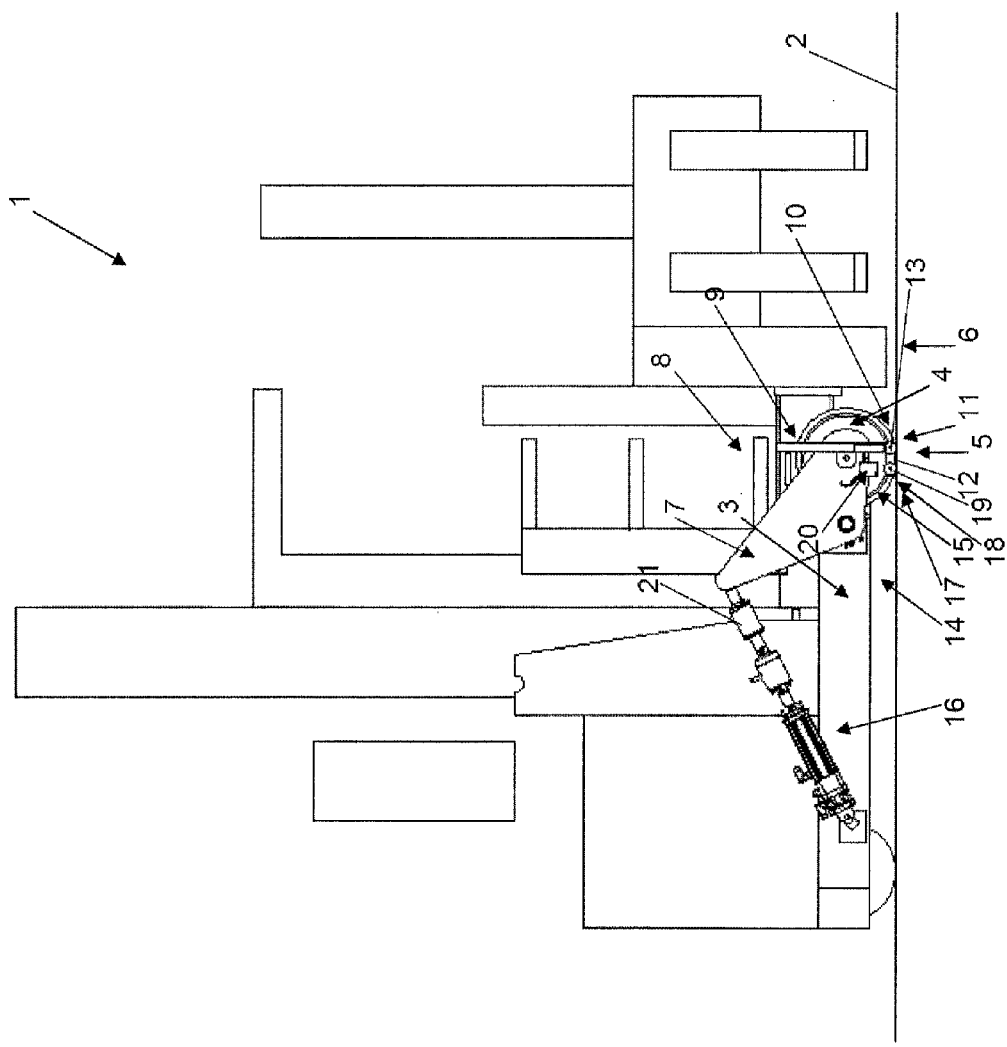
FIG. 1 is a side view of a vehicle according to the invention.

The following is a detailed description of the invention.

The present invention relates to vehicles of any kind. It is particularly suitable for industrial vehicles, in particular industrial vehicles that have great height relative to the wheel base. Examples include scissor lifts; aerial lifts; aerial work platforms; cherry pickers; cranes, in particular straddle cranes; straddle carriers; access platforms; and the like.

The invention will be illustrated specifically with reference to industrial vehicles, more particularly to fork lift trucks, and still more specifically to Narrow Aisle and Very Narrow Aisle trucks.

Narrow Aisle trucks and Very Narrow Aisle (VNA) trucks are used in warehouses in which goods are stored on pallets in very tall (17 meters or higher) racks. VNA trucks move back and forth between the racks at speeds up to 12 kilometers per hour or even higher. It will be understood that even small imperfections in the surface of the warehouse floor will cause the chassis of a VNA truck to tilt. Even a modest amount of chassis tilt causes a major inclination of the tall mast of a VNA truck. The movement of the mast is amplified when the truck carries a heavy load with the fork in a high position. As the truck operates in close proximity to the storage racks even modest chassis movements may cause the mast to slam into the racks.

For perspective, it requires a high level of skill and care on the part of the installer to build a concrete floor that is smooth enough to meet the requirements of DIN Standard 18202 Tabelle 3, Zeile 3. Yet, even floors meeting this norm are not smooth enough for safe operation of a VNA truck at its design speed. The VNA truck will need to be operated at a lower speed, which causes a productivity loss, or the floor needs to be smoothed, for example using a grinding machine ("Q Plane") as disclosed in European Patent No. 1 549 462 B1.

The present invention provides a system for stabilizing the ride of a vehicle when the vehicle is traveling on a surface. Imperfections in the surface of the traveling surface will at times be referred to as "undulations", which is a good description of surface imperfections in a concrete industrial floor. It will be understood that the system is equally suitable for dealing with other types of surface imperfections.

According to preferred embodiments of the current invention, the surface undulations are sensed by a sensor, and are electronically transmitted to a compensation means. It has been found that such transmittal of measured undulations can be done quickly such that compensation of the undulations can also be done at higher vehicle speeds.

According to preferred embodiments of the current invention, when the vehicle is travelling the sensor periodically determines a characteristic representing the surface of the floor at the supporting location of the supporting wheel along the supporting path. The compensation means compensates a roll and/or pitch movement caused by movement of the vehicle over a surface as determined by the characteristic for the surface of the floor. Such a method has been found to easily allow to predict the undulations in the surface of the floor, and to timely counteract them to avoid roll and/or pitch movements of the vehicle, while being sufficiently accurate to reduce roll and/or pitch movements of the vehicle.

Characteristics representing the surface of the floor at the supporting location of the supporting wheel can for example be a derivate of the surface, for example in function of the distance along the supporting path of the supporting wheel, the height of the surface, for example the distance from the chassis to the surface of the floor, in function of the distance along the supporting path of the supporting wheel, etc.

According to preferred embodiments of the current invention, the sensor comprises measuring means determining the characteristic at a measuring location along the supporting path at a predetermined distance along the supporting path from the supporting location of the supporting wheel. It has been found that the predetermined distance allows to sense future undulations in a relative easy way.

According to more preferred embodiments of the invention, the measuring location is located in front of the supporting location when driving the vehicle. It has been found that such a configuration allows an improved indication of future undulations of the floor. Such a configuration is however not critical for the invention and the measuring location can also be located behind the supporting location of the supporting wheel as it has been found that such a configuration also, although to a lesser degree, allows to predict the undulations in the surface of the floor.

According to preferred embodiments of the current invention, the characteristic periodically determined by the sensor is a derivative, for example the first derivate, of the surface of the floor at the supporting location of the supporting wheel along the supporting path. Such a method has been found to easily allow to predict the undulations in the surface of the floor, and to timely counteract them to avoid or reduce roll and/or pitch movements of the vehicle. The derivative of the surface of the floor at the supporting location of the supporting wheel along the supporting path can be determined with respect to for example the distance along the supporting path and preferably is used, together with the speed of the vehicle along the supporting path, to steer the compensation means such as to compensate a roll and/or pitch movement caused by driving the vehicle over the derivative of the surface of the floor.

According to more preferred embodiments of the invention, the measuring means measures, while driving, a parameter indicative of the height difference with respect to the supporting location of the supporting wheel at the measuring location along the supporting path at the predetermined distance along the supporting path from the supporting location of the supporting wheel and in that the parameter is used to approximate the derivative of the surface of the floor at the supporting location of the supporting wheel. Such a method has been found relatively easy to implement while maintaining a sufficient compensation of the roll and/or pitch movement of the vehicle.

According to preferred embodiments of the method according to the present invention, the sensor comprises second measuring means measuring, while driving, a second parameter indicative of the height difference with respect to the supporting location of the supporting wheel at a second measuring location along the supporting path at a second predetermined distance along the supporting path from the supporting location of the supporting wheel and in that the first and second parameter are used to approximate the derivative, for example the first derivative, of the surface of the floor at the supporting location of the supporting wheel. The second predetermined distance, opposed to the first predetermined distance, can be zero, for example to approximate the supporting location, but preferably is larger than zero.

According to preferred embodiments of the current invention, the derivative, for example the first derivative, is approximated by a line interconnecting the surface of the floor at the first and the second measuring location. It has been found that such an approximation of the derivative, for example the first derivative, of the surface of the floor can be easily done using the first and the second parameter determined by the sensor based on the predetermined distance from the supporting location.

According to preferred embodiments of the current invention, the first measuring location is located in front of the supporting location and in that the second measuring location is located behind the supporting location along driving direction of the vehicle. It has been found that such a configuration offers an improved approximation of the derivative, for example the first derivative, of the surface of the floor at the supporting location. According to more preferred embodiments the first and the second predetermined distances are substantially equal, or even equal.

According to more preferred embodiments of the invention, the, for example first, derivative of the surface of the floor at the supporting location of the supporting wheel is approximated by a line interconnecting the supporting location of the supporting wheel and the surface of the floor at the measuring location. It has been found that such an approximation of the, for example first, derivative of the surface of the floor can be easily done using the parameter determined by the sensor based on the predetermined distance from the supporting location.

According to preferred embodiments of the current invention, the sensor comprises a floor surface contact element attached to the vehicle and following the surface of the floor at the measuring location while the vehicle is travelling, the measuring means measuring the up and down movement of the floor surface contact element during travel of the vehicle, the movement of the floor surface contact element being indicative of the undulations of the surface of the floor. It has been found that such a contact element is easy to apply and allows a sufficient measurement of the undulations of the floor for an improved avoidance of roll and/or pitch movement of the vehicle while driving the vehicle.

Such a floor surface contact element is however, not critical for the invention and can also be, for example a distance measurer, for example an optical or acoustical distance measurer, which is mounted to the chassis at a distance from the supporting wheel supporting the vehicle at the supporting location along the supporting path and, during driving of the vehicle, measuring the distance to the floor.

According to preferred embodiments of the current invention, the parameter indicative of the height difference with respect to the supporting location of the supporting wheel at the measuring location along the supporting path at the predetermined distance along the supporting path from the supporting location of the supporting wheel is for example the angle of rotation of an attachment member rotating around an axle with respect to a predetermined reference when following up and down movement of the floor surface contact element when moving over the surface. It has been found that such an angle of rotation can be easily measured while nevertheless allowing an improved roll and/or pitch avoidance of the vehicle.

Although a rotary encoder can be used to determine the angle of rotation of the attachment member rotating around the axle with respect to the predetermined reference when following up and down movement of the floor surface contact element when moving over the surface, this is not critical for the invention and preferably the angle of rotation is determined by measuring the distance between the surface contact element and, for example, the chassis, for example using optical or acoustical distance measuring means, the distance between the surface contact element and the chassis changing when the contact element follows up and down movement of the floor surface contact element when moving over the surface. It has been found that such distance measuring means are often more accurate than rotary encoder.

According to more preferred embodiments of the current invention, the floor surface contact element is a measurement wheel, more preferably attached to the attachment member if present. Such a configuration has been found more accurate as a wheel moves relatively easy over a surface by rotating over the surface.

According to preferred embodiment of the current invention, the sensor comprises a further second floor surface contact element attached to the vehicle and following the surface of the floor at a further second measuring location during travel of the vehicle, further second measuring means measuring the up and down movement of the second floor surface contact element while the vehicle is traveling over the surface, the movement of the second floor surface contact element being indicative of the undulations of the surface of the floor. It has been found that such a further contact element is easy to apply and allows a sufficient measurement of the undulations of the floor for an improved avoidance of roll and/or pitch movement of the vehicle while driving the vehicle.

According to preferred embodiments of the current invention, the second parameter indicative of the height difference with respect to the supporting location of the supporting wheel at the second measuring location along the supporting path at the second predetermined distance along the supporting path from the supporting location of the supporting wheel for example is the angle of rotation of, for example, a second attachment member rotating around, for example, a second axle with respect to a predetermined reference when following up and down movement of the second floor surface contact element when moving over the surface.

According to more preferred embodiments of the current invention, the second floor surface contact element is a second measurement wheel more preferably attached to the second attachment member if present. Such a configuration has been found more accurate as a wheel moves relatively easy over a surface by rotating over the surface.

According to more preferred embodiments of the current invention, the compensation means comprise means for adjusting the height position, with respect to the chassis of the vehicle, of a supporting wheel supporting the vehicle on the floor while driving. Such a configuration has been found easy to apply and nevertheless allows avoiding roll and/or pitch movement of the vehicle.

According to further preferred embodiments, the roll and/or pitch adjustment supporting wheel is the supporting wheel at the supporting location. This is however not critical for the invention and also other wheels can be the roll and/or pitch adjustment supporting wheel, for example an opposing supporting wheel at a side of the vehicle opposing the supporting wheel at the supporting location with respect to the travelling direction of the vehicle, the opposing supporting wheel and the supporting wheel at the supporting location preferably forming a pair of supporting wheels, more preferably having substantially the same axis of rotation.

According to preferred embodiments of the method according to the current invention, the means adjusting the height position of the roll and/or pitch adjustment supporting wheel supporting the vehicle on the floor with respect to the chassis of the vehicle while driving, comprise a lever, for example a linear actuator driven lever, hydraulic lever, etc. It has been found that such a lever allows an easy manipulation of the supporting wheel. Although the use of a lever for adjusting the position of the roll and/or pitch adjustment supporting wheel supporting the vehicle is preferred as it allows adjusting the adjustment supporting wheel with less force, the use of a lever is not critical for the invention and the adjustment supporting wheel may also be adjusted without the use of the lever by, for example, a linear actuator, hydraulics, etc.

According to preferred embodiments of the method according to the current invention, the chassis has at least a second supporting wheel supporting the vehicle on the floor at a second supporting location along a second supporting path and a second sensor for sensing undulations in the floor in the second supporting path of the second supporting wheel while travelling over the undulating floor. Such a configuration allows to further decrease roll and/or pitch movement, and especially roll movement, of the industrial vehicle, especially when first and the second supporting wheel at the respective first and second supporting location and the first and second supporting path are positioned along opposing sides of the vehicle, more in particular when the second supporting wheel and the first supporting wheel form a pair of supporting wheels, even more in particular when having substantially the same axis of rotation as in such configuration undulations occurring at both supporting locations can be compensated to decrease roll movements of the vehicle which is especially effective when the supporting locations are situated at sides opposing each other with respect to the travelling direction of the vehicle.

Although it has been found that a single roll and/or pitch adjustment supporting wheel is sufficient for acceptably reducing roll movement of an industrial vehicle, according to more preferred embodiments of the method according to the current invention, it has been found that, for reducing pitch movements at least two roll and/or pitch, it is beneficial to provide adjustment supporting wheels on opposing sides of the vehicle with respect to the travelling direction of the vehicle, preferably forming a pair of roll and/or pitch adjustment supporting wheel, more preferably having substantially the same axis of rotation. In such configuration, the first and second roll and/or pitch adjustment supporting wheels are the first and second supporting wheels at the respective first and second supporting location, for example the first roll and/or pitch adjustment supporting wheel being the first supporting wheel at the first supporting location and the second roll and/or pitch adjustment supporting wheel being the second supporting wheel at the second supporting location or vice-versa.

According to preferred embodiments of the method according to the invention, the vehicle additionally comprises means for elastically absorbing relatively high-frequency vibrations. It has been found that such means allow to further decrease unwanted vibrations and/or noises as it has been found that such means allow to absorb relatively high frequent undulations in the surface of the floor.

For example, the supporting wheel has an elastic floor contacting surface. It has been found that such an elastic floor contacting surface allows to further decrease unwanted vibrations and/or noises as it has been found that such an elastic floor contacting surface of the wheel allows to absorb relatively high frequent undulations in the surface of the floor. Although elastic floor contacting surfaces for wheels have been avoided in industrial vehicles, especially in industrial vehicles lifting loads to relative high locations such as for example narrow aisle lifting trucks, as they compromise the stability of the trucks, it has now surprisingly been found that in combination with the method according to the invention, the stability can be sufficiently improved to allow the use of wheels having elastic floor contacting surfaces.

According to other more preferred embodiment of the method according to the current invention, the means for elastically absorbing relatively high-frequency vibrations comprise at least one, preferably elastomeric, bushing as a bearing for the supporting wheel or supporting wheels of the vehicle, while driving the vehicle, elastically absorbing relatively high frequent undulations in the surface of the floor.

According to preferred embodiments of the method according to the current invention, the vehicle has at least three supporting wheels, of which one pair of supporting wheels is situated along opposing sides of the vehicle with respect to the travelling direction. More preferably, one, or more preferably both wheels of the pair of supporting wheels is located at a first or second supporting location. Even more preferably, such a pair of supporting wheels located at the first and/or second supporting location, is located near, preferably nearest, the location of the centre of mass of the vehicle, preferably when loaded, preferably with respect to the other supporting wheels or pair of supporting wheels of the vehicle, more preferably.

According to preferred embodiments of the method according to the current invention, the vehicle is used indoors and/or the industrial vehicle is an industrial lifting vehicle, such as for example a stage lift, a scissor lift, a forklift, such as for example a fork lift truck, such as for example a narrow aisle forklift truck, order picking truck, reach truck, stacker truck, etc.

According to preferred embodiments of the method according to the current invention, the vehicle comprises means for sensing vibrations, allowing the compensation means to compensate for vibrations that are insufficiently corrected by the sensor, for example substantially constant vibrations which are insufficiently sensed by the sensor.

The invention also relates to a vehicle provided for carrying out the method according to the invention wherein the vehicle comprises a chassis with at least one supporting wheel supporting the vehicle on the floor at a supporting location along a supporting path, a sensor for sensing undulations in the floor in the supporting path of the supporting wheel while driving the undulating floor; and roll and/or pitch compensation means for compensating the roll and/or pitch movement of the vehicle caused by the undulations in the floor, the sensor being provided to sense future undulations in the floor in the supporting path with respect to the surface of the floor at the supporting location of the supporting wheel and the compensation means are provided to compensate a future roll and/or pitch movement to be caused by the future undulations in the supporting path in response to the sensed undulations.

The principle of the present invention is based on the recognition that surface imperfections, such as undulations, cause a kinematic effect to be exerted on a supporting wheel of a travelling vehicle. The essence of the method of the present invention is that it determines the magnitude and the direction of the kinematic effect, and creates a counteracting kinematic effect that has (close to) equal magnitude, but the opposite direction (i.e., the opposite sign).

To illustrate the principle, a vehicle may be equipped with sensors that determine or approximate the slope of a travelling surface at the supporting position of the supporting wheel. The slope is upward in the direction of travel of the vehicle, which is defined as the positive direction for the purpose of this example. The slope has a magnitude of Z [m/m]. If the vehicle is travelling at a speed of V m/s, the slope exerts an upward speed on the support wheel of V×Z m/s. This is a kinematic effect exerted on the support wheel by the travelling surface, and is referred to as the first kinematic effect. It is also referred to as a surface speed. Its direction is upward, and therefore the surface speed has a positive sign.

The compensating means or actuator is designed to exert on the support wheel a second kinematic effect, which counteracts the first kinematic effect. In other words, the actuator imparts on the support wheel a speed equal in magnitude to, but opposite in direction of, the surface speed. Put differently, the second kinematic effect is a speed of minus V×Z m/s. As will be explained in more detail below, the net effect of these two counteracting speeds is an absence of vertical movement of the chassis, which is the intended goal. In practice the intended goal may not be fully reached, because of measuring inaccuracies, reaction delays, etc.

It is also possible to measure a vertical acceleration of the support wheel, as may be exerted by a surface imperfection, using an accelerometer. Let the acceleration be +A m/s$^2$. In this example this acceleration is the first kinematic effect, and can be referred to as a surface acceleration. The compensating means or actuator exerts an acceleration equal to minus A m/s$^2$. This is the second kinematic effect, counteracting the first kinematic effect.

Use of surface acceleration as an input parameter to the system offers various advantages over use of surface speed as the input parameter. Firstly, for use of the surface acceleration the speed of the vehicle does not need to be known or measured. Secondly, acceleration has predictive properties, in that surface acceleration predicts the surface speed that the support wheel will have in the next time interval. It will be understood that the term "time interval" in this context refers to very brief intervals, for example 1 ms (millisecond). In addition, accelerometers are compact and relatively inexpensive.

An important drawback of the use of surface acceleration as an input parameter is that no input signal will be provided as the vehicle starts travelling from standstill. In order to be of practical use (velocity prediction) the accelerometer signal has to be filtered by a high pass filter (e.g. cutoff frequency of 0.1 Hz). As a consequence the filtered accelerometer signal does not provide a reliable input in the lower speed range. More generally, the surface speed approach offers more accurate results at low travel speeds than does the surface acceleration approach, whereas the surface acceleration approach may produce more accurate results at higher vehicle speeds.

In a preferred embodiment the vehicle is equipped with both an accelerometer and a sensor, or sensors, for determining a slope in the support path. This technique is also known as sensor fusion. Put differently, the system determines both a first derivative and a second derivative of the travelling surface. A controller determines a weighted average of the two input parameters, such that the first derivative is given greater weight at low vehicle speeds, the second derivative is given greater weight at higher vehicle speeds, and both parameters are given equal weight at an intermediate vehicle speed. It is also possible to apply more sophisticated algorithms to deal with measurement uncertainties like e.g. the Kalman filter or linear quadratic estimation.

Optionally the vehicle comprises a safety mechanism that monitors the compensation system and/or a tilt angle of the vehicle chassis. The safety mechanism monitors the compensation system for its proper functioning. In case the safety mechanism determines that the compensation mechanism is not functioning properly it blocks the compensation mechanism and/or moves the support wheel to a default position, typically a neutral position. In case of a catastrophic failure of the compensation mechanism, the safety mechanism may block all functions of the vehicle, to prevent accidents. Alternatively or additionally, the safety mechanism may monitor a tilt angle of the chassis of the vehicle, and block the compensation mechanism if the tilt angle exceeds a predetermined value.

Description of Illustrative Embodiments/Examples

The following is a description of certain embodiments of the invention, given by way of example only and with reference to the drawings.

The invention will be further elucidated by means of the following description and the appended figures.

FIG. 1 shows a side-view of an embodiment of a vehicle according to the present invention.

In the following detailed description, numerous specific details are set forth in order to provide a thorough understanding of the invention and how it may be practiced in particular embodiments. However, it will be understood that the present invention may be practiced without these specific details. In other instances, well-known methods, procedures and techniques have not been described in detail, so as not to obscure the present invention. While the present invention will be described with respect to particular embodiments and with reference to certain drawings, the invention is not limited hereto. The drawings included and described herein are schematic and are not limiting the scope of the invention. It is also noted that in the drawings, the size of some elements may be exaggerated and, therefore, not drawn to scale for illustrative purposes.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

1. Industrial vehicle
2. Floor
3. Chassis
4. Supporting wheel
5. Supporting location
6. Supporting path
7. Compensation means
8. Sensor
9. Measuring means
10. Measuring location
11. Floor surface contact element
12. Attachment member
13. Axle
14. Adjustment means
15. Adjustment supporting wheel
16. Linear actuator driven lever
17. Second measuring means
18. Second measuring location
19. Second surface contact element
20. Distance measuring means
21. Element with a degree of elasticity
22. Mechanical spring element
23. Pneumatic or hydropneumatic spring element
24. Mechanical clamping device
25. Valve
40. Multiplication element in control scheme
41. Summation element in control scheme FIG. 1 shows a side view of a preferred embodiment of an industrial vehicle 1 according to the present invention.

The vehicle 1 shown in FIG. 1 is provided for carrying out the method according to the invention. The industrial vehicle 1 shown is an indoors industrial lifting vehicle, more in particular a fork lift truck, even more in particular a narrow aisle fork lift truck 1.

The truck 1 comprises a chassis 3 with at least one supporting wheel 4 supporting the vehicle 1 on the floor 2 at a supporting location 5 along a supporting path 6. The truck 1 also comprises a sensor 8 for sensing undulations in the floor 2 in the supporting path 6 of the supporting wheel 4 when vehicle 1 is travelling over the undulating floor 2; and roll and/or pitch compensation means 7 for compensating the roll and/or pitch movement of the vehicle 1 caused by the undulations in the floor 2. The sensor 8 is provided to sense undulations in the floor 2 in the supporting path 6 with respect to the surface of the floor 2 at the supporting location 5 of the supporting wheel 4. Compensation means 7 are provided to compensate an anticipated roll and/or pitch movement to be caused by the undulations encountered in the supporting path 6.

The sensor 8, preferably periodically, determines a characteristic of the surface of the floor 2 at the supporting location 5 of the supporting wheel 4 along the supporting path 6. Preferably, the sensor electronically determines the characteristic and the compensation means 7 are electronically controlled in function of the determined characteristic.

The sensor 8 preferably comprises measuring means 9 for determining the characteristic at a measuring location 10 along the supporting path 6 at a predetermined distance along the supporting path 6 from the supporting location 5 of the supporting wheel 4. The measuring location 10 shown in FIG. 1 is for example in front of the supporting wheel 4.

The characteristic periodically determined by the sensor 8 shown in FIG. 1 is a derivative, for example the first derivate, of the surface of the floor 2 at the supporting location 5 of the supporting wheel 4 along the supporting path 6.

Thereto, the measuring means 9 preferably measure a parameter indicative of the height difference with respect to the supporting location 5 of the supporting wheel 4 at the measuring location 10 along the supporting path 6 at the predetermined distance along the supporting path 6 from the supporting location 5 of the supporting wheel 4. The parameter is preferably used to approximate the derivative of the surface of the floor 2 at the supporting location 5 of the supporting wheel 4.

As shown in FIG. 1, the sensor 8 may comprise further second measuring means 17 measuring a second parameter indicative of the height difference with respect to the supporting location 5 of the supporting wheel 4 at a second measuring location 18 along the supporting path 6 at a second predetermined distance along the supporting path from the supporting location 5 of the supporting wheel 4. As can be seen the second measuring location 18 is located behind the supporting wheel 4, although this is not critical for the invention. The first and second parameters preferably are used to approximate the derivative of the surface of the floor 2 at the supporting location 5 of the supporting wheel 4. In such a configuration, the derivative is approximated by a line interconnecting the surface of the floor 2 at the first and the second measuring locations 10, 18.

As can be seen in FIG. 1, the sensor 8 preferably comprises a floor surface contact element 11 attached to the vehicle 1 and following the surface of the floor 2 at the measuring location 10 as vehicle 1 travels over floor 2 Measuring means 9 measuring the up and down movements of the floor 2 surface contact element 11 the movement of the floor 2 surface contact element 11 being indicative of the undulations of the surface of the floor 2.

As can be seen in FIG. 1, as the sensor 8 comprises two measuring means 9, 17, the sensor comprises two surface contact elements 11, 19 attached to the vehicle 1. A first contact element 11 being attached to the chassis 3 and moving over the surface in an up and down movement, preferably without rotating, a second contact element 19 attached to the first contact element 11 through a rod 13.

The distance over which the first contact element 11 has moved up and down with respect to the chassis 3 is the first parameter indicative of the height difference with respect to the supporting location 5 of the supporting wheel 4 at the first measuring location 10 along the supporting path 6 at the first predetermined distance along the supporting path 6 from the supporting location 5 of the supporting wheel 4.

The angle of rotation of an attachment member 12 rotating around the axle 13 with respect to a predetermined reference when following up and down movement of the floor 2 surface contact element 11 when moving over the surface of the floor 2 is the second parameter indicative of the height difference with respect to the supporting location 5 of the supporting wheel 4 at the second measuring location 18 along the supporting path 6 at the second predetermined distance along the supporting path 6 from the supporting location 5 of the supporting wheel 4. The derivative is preferably approximated by a line interconnecting the surface of the floor 2 at the first and the second measuring location 10, 18. More preferably, the first measuring location 10 is located in front of the supporting location 5 and in that the second measuring location 18 is located behind the supporting location 5 along the direction of travel of the vehicle 1.

Barring any dimensional constraints—e.g. wheel diameter vs. distance between the measurement locations along the track—it is possible to position the sensor system in such way that it senses the surface characteristic of exactly the same track upon which the wheel travels. In this embodiment it is relatively difficult to tune the sensitivity of the sensor system to the desired responsiveness of the controlled system.

It is also possible to position the sensor system alongside of the wheel that travels upon the surface. This embedment provides dimensional freedom to implement various types of sensors of varying sizes and positioned in varying measurement locations. The sensed surface characteristic differs from the surface characteristic of the wheel track, but because the sensed track lies in the near vicinity of the wheel track—e.g. right next to the wheel—it generally differs very little form the wheel track itself.

The first and the second parameters can be mutually measured by measuring the angle of rotation of the attachment member 12, as shown in FIG. 1, by distance measuring means 20 measuring the distance between the attachment member 12 and the chassis 3 such that the distance measuring means 20 measures both information relating to the first and to the second parameter.

As can be seen, the floor surface contact element 11, 19 preferably is a measurement wheel, more preferably attached to the attachment member 12 if present.

As can be seen in FIG. 1, the compensation means 7 preferably comprise means 14 adjusting the height position of a roll and/or pitch adjustment supporting wheel 15 supporting the vehicle 1 on the floor 2 with respect to the chassis 3 of the vehicle 1.

Preferably, as seen in FIG. 1, the means 14 adjusting the height position of the roll and/or pitch adjustment supporting wheel 15 supporting the vehicle 1 on the floor 2 with respect to the chassis 3 of the vehicle 1 while driving, comprise a linear actuator-driven lever 16.

In FIG. 1, the roll and/or pitch adjustment supporting wheel 15 is the supporting wheel 4 at the supporting location 5.

Although not shown in FIG. 1, the chassis 3 has at least a second supporting wheel supporting the vehicle 1 on the floor 2 at a second supporting location along a second supporting path and a second sensor for sensing undulations in the floor in the second supporting path of the second supporting wheel while driving over the undulating floor 2. Although not shown in the figure, the first 4 and the second supporting wheel at the respective first 5 and second supporting locations and the first 6 and second supporting paths preferably are positioned along opposing sides of the vehicle 1, more in particular the second supporting wheel and the first supporting wheel 4 form a pair of supporting wheels, even more in particular having substantially the same axis of rotation.

Preferably, although not shown in the figures, for avoiding pitch movements at least two, a first 15 and a second, roll and/or pitch adjustment supporting wheel on opposing sides of the vehicle 1 with respect to the travelling direction of the vehicle 1 are present, preferably forming a pair of roll and/or pitch adjustment supporting wheels, more preferably having substantially the same axis of rotation, wherein the first 4 and second roll and/or pitch adjustment supporting wheel of the pair are the first 4 and second supporting wheel at the respective first 5 and second supporting location.

Although not shown in the figures, the vehicle 1 preferably comprises means for elastically absorbing relatively high-frequency vibrations.

Figure 2:
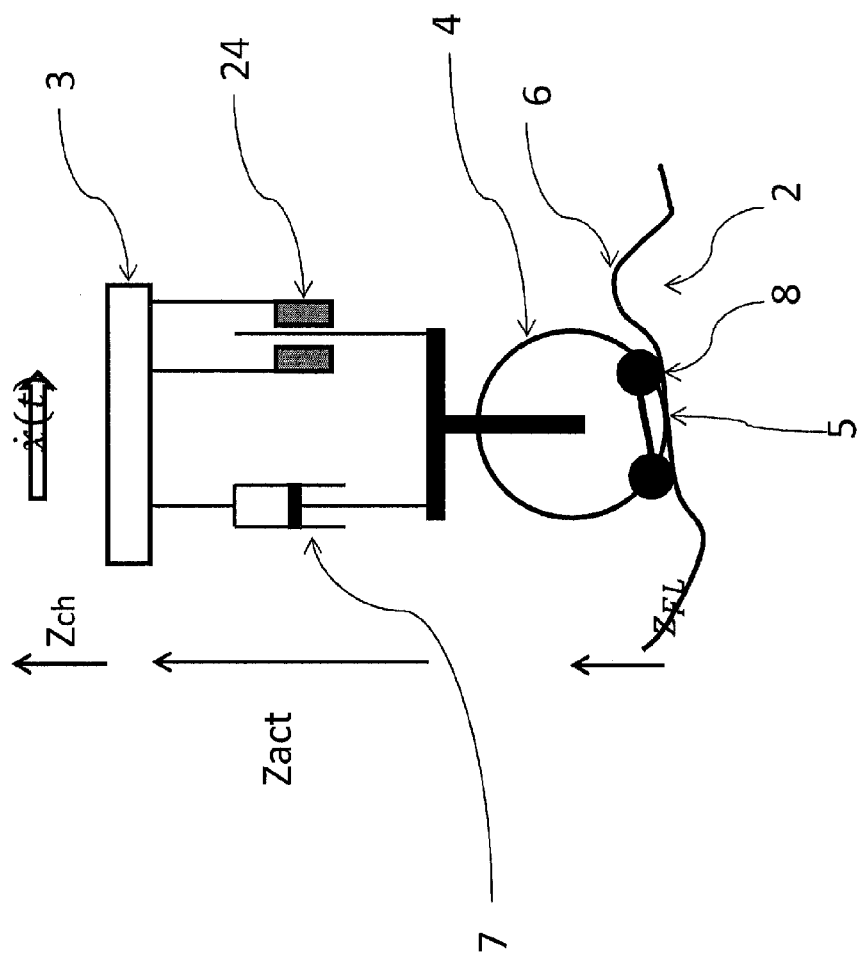
FIG. 2 is a schematic representation of a compensation system according to the invention.

FIG. 2 is a schematic representation of the compensation system. Supporting wheel 4 follows support path 6 as the vehicle travels along floor 2. Sensor 8 measures the height difference $\Delta Z_{FL}$ of the surface of floor 2. The distance $Z_{act}$ between wheel 4 and chassis 3 is adjustable by means of compensation means 7. The vertical position $Z_{ch}$ is given by:

$$Z_{ch} = Z_{FL} + Z_{act}$$

The goal is to avoid vertical movement of the chassis, that is, to keep $Z_{ch}$ unchanged.

The vehicle has a traveling speed $\dot{x}(t)$ (m/s). As explained above, sensor 8 provides a signal corresponding to, or convertible to, the derivative of $Z_{FL}$, that is, the slope of supporting path at supporting location 5. This slope, expressed for example as the change in $Z_{FL}$ (mm) per distance traveled (mm) along supporting path 6 is a dimensionless number. Multiplication of the slope with $\dot{x}(t)$ yields surface speed $V_{FL}$. Conceptually the surface speed can be considered the vertical speed imparted to supporting wheel by floor surface 6. Put differently, $V_{FL}$ is the kinematic effect exerted on supporting wheel 4 by traveling surface 6. The sign of $V_{FL}$ is the same as that of the slope when $\dot{x}(t)$ has a positive sign.

As the goal is to keep the vertical position of chassis 3 unchanged, the vertical speed $V_{ch}$ of chassis 3 should be zero. Since $$V_{ch} = V_{FL} + V_{act}$$

it follows that $$0 = V_{FL} + V_{act}$$

and $$V_{act} = -V_{FL}$$

In other words, the compensation means must create a speed that is equal to, but opposite in sign to, the surface speed.

Figure 3:
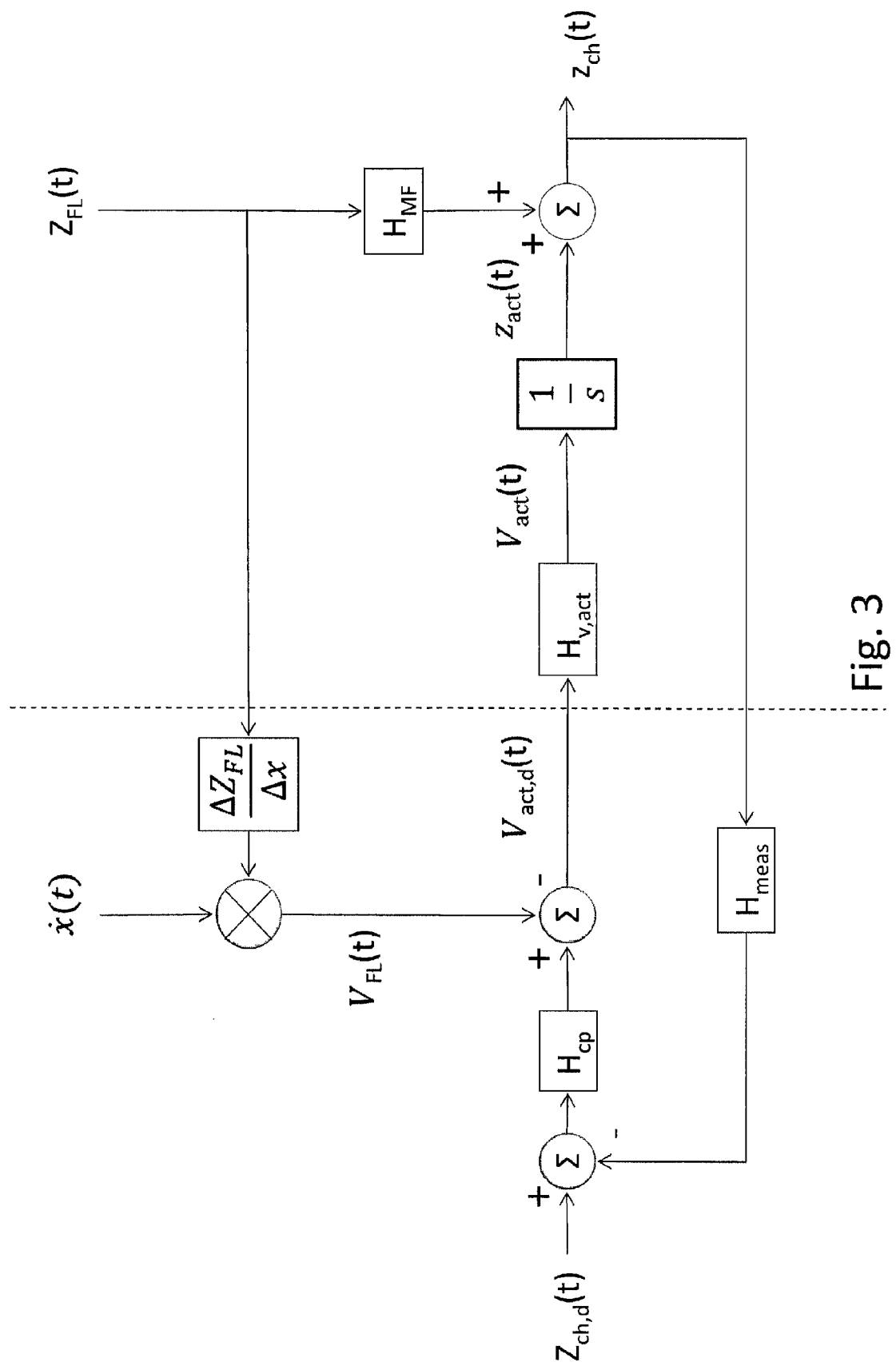
FIG. 3 is a block diagram of a control circuit for use in a vehicle according to the invention.

FIG. 3 shows a block diagram of the control circuit. Input parameters are $Z_{FL}$ and $\dot{x}(t)$. $\Delta Z_{FL}$ is determined as explained above. The traveling speed of the vehicle $\dot{x}(t)$ can be determined by any suitable means, such as the speed of rotation of one of the (driven) wheels, etc. The first derivative of $Z_{FL}$ is multiplied by $\dot{x}(t)$ to yield surface speed $V_{FL}$. Sign inversion yields $V_{act,d}$. Power is supplied to compensation means 7 to generate the desired $V_{act,d}$.

It should be noted that compensation means 7 is controlled so as to produce a desired speed, as distinguished from generating a desired force, for example. This is particularly important in the context of industrial vehicles such as fork lift trucks, which may carry loads of considerably varying weights, or no load at all. The control mechanism for compensation means 7 contains a feedback loop that compares the obtained speed ($V_{act}$) with the desired speed ($V_{act,d}$), and allows for the power supplied to compensation means 7 to be adjusted until the desired speed is obtained. In this manner the control mechanism automatically adjusts for weight differences resulting from the presence or absence of a load.

Block $H_{MF}$ in FIG. 3 denotes a transfer function for the optional presence of a mechanical low pass filter. As explained above, such filter can be provided in the form of a degree of elasticity of supporting wheel 4. Such elasticity may be provided in the form of a wheel construction from a slightly elastic material, provision of a rubber bushing around the axis of wheel 4, a rubber ring around the circumference of wheel 4, and other such measures known in the art. If wheel 4 can be considered perfectly rigid the value of transfer function $H_{MF}$ can be put at 1; if wheel 4 has elastic properties the value of $H_{MF}$ is less than 1 at higher frequency values (e.g. 10 Hz and up). The actual value can be determined experimentally, and pre-programmed into the control software depicted by FIG. 3.

The lower portion of FIG. 3 shows a feedback loop. As $\Delta Z_{FL}$ is measured without a fixed reference point, the control loop shown in the upper portion of FIG. 3 may result in a drift in the value of $Z_{ch}$, which in turn would result in a persistent change of height of the chassis. Block $H_{meas}$ denotes an absolute level measurement, such as a construction laser and a precision measuring laser detector. A persistent deviation from level is fed to block $H_{v,act}$ as a correction of the calculated $V_{act,d}$.

A precision measuring laser detector is highly accurate, but relatively slow. For example, the feedback loop of FIG. 3 may operate at a frequency on the order of 0.1 Hz, whereas the control circuit may operate at a frequency of 5 Hz or higher. For vehicles that move very slowly, a frequency of 0.1 Hz may be high enough for the control circuit. In such cases a precision measuring laser detector could be used for the control circuit.

In a roll compensated control strategy, a constant velocity drift can be observed as the average misalignment with respect to the horizontal reference measured by an electronic carpenter's level.

Figure 4:
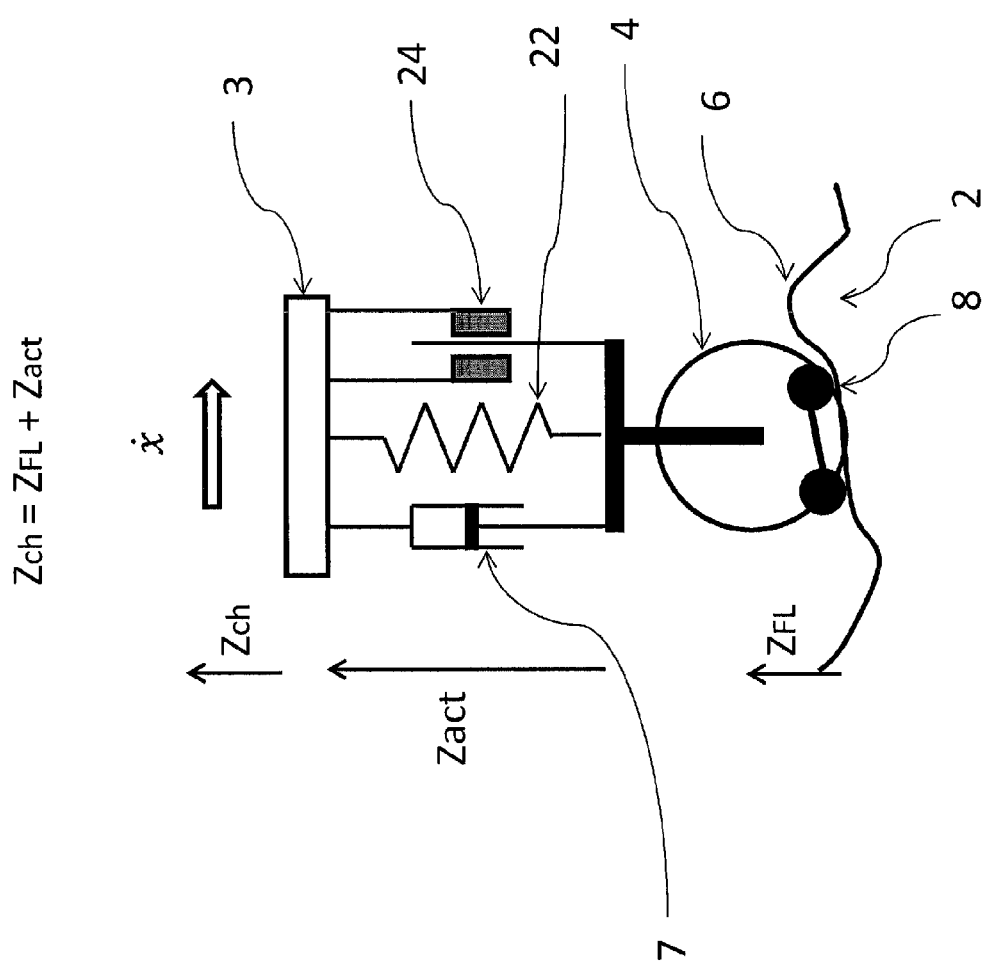
FIG. 4 is an alternate embodiment of a wheel suspension system for use in a vehicle according to the invention.

FIG. 4 shows an alternate suspension for supporting wheel 4. Whereas in the arrangement of FIG. 2 the compensation means 7 supports the weight of the chassis (including any loads). In the arrangement of FIG. 4 the weight is carried by spring 22, reducing the task of compensation means 7 to providing the kinematic effects for counteracting the kinematic effects of supporting path 6. As a result the compensation means of FIG. 4 can be much lighter than that of FIG. 2.

Figure 5:
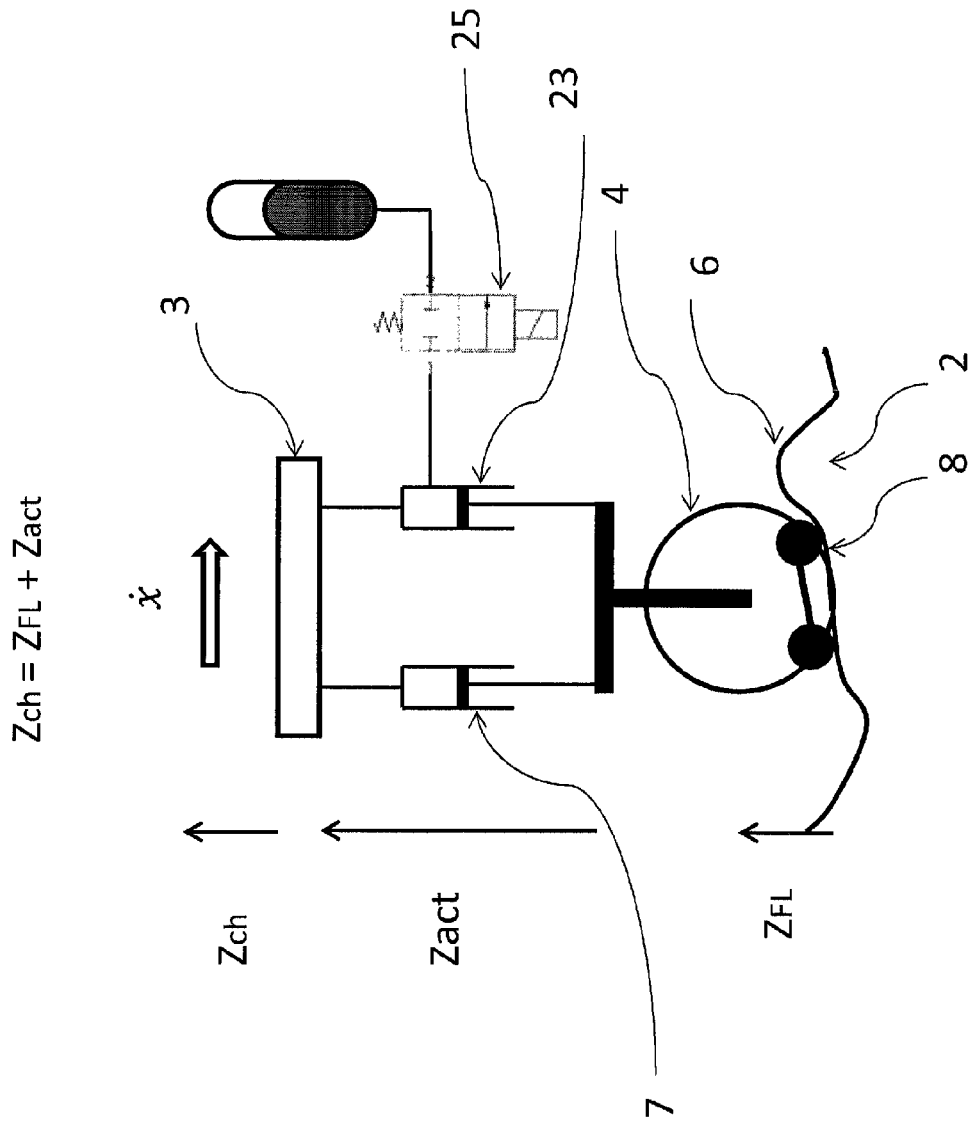
FIG. 5 is yet another embodiment of a wheel suspension system for use in a vehicle according to the invention.

FIG. 5 shows an arrangement similar to that of FIG. 4, except that coil spring 22 is replaced with pneumatic spring 23. Instead of a pneumatic spring a hydraulic spring or equivalent construction can be used.

FIGS. 2, 4 and 5 also show an arrangement to block the compensation means in case of catastrophic failure. Mechanical clamping device 24 creates a fixed connection between wheel 4 and chassis 3 when activated. Valve 25 blocks the oil flow of a hydropneumatic spring element 23 when activated and fixes in this way wheel 4 to chassis 3.

Figure 6A:
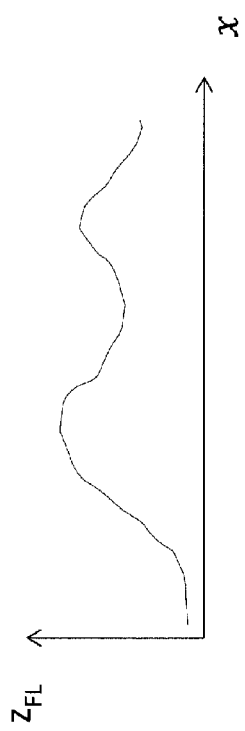
FIG. 6A is a schematic representation of floor height $Z_{FL}$ in function of travel path x.

The general principles of the present invention will be explained with reference to FIGS. 6A through 6C FIG. 6A is a schematic representation of the height $Z_{FL}$ of a floor in function of the travel path x. Mathematically this can be written as:

$$Z_{FL}=f(x)$$

The first derivative:

$$\dot{z}_{FL}=f'(x)\dot{x}$$

Wherein $\dot{x}=dx/dt$, the first derivative of x as a function of time.
And the second derivative:

$$\ddot{z}_{FL}=f''(x)\dot{x}^2+f'(x)\ddot{x}$$

Wherein $\ddot{x}=d^2x/dt^2$, the second derivative of x as a function of time.

FIG. 6B shows a method for approximating f'(x). Supporting wheel 4 is traveling on path 6. A first sensor 9 measures $Z_{FL}$ at a first measuring location in front of supporting wheel 4. A second sensor 17 measures $Z_{FL}$ at a second measuring location. The distance between first sensor 9 and the second sensor 17 are separated by a distance $\Delta x$. The two sensors measure a difference in floor height $\Delta Z_{FL}$. The derivative f'(x) can be approximated as $f'(x)=\Delta Z_{FL}/\Delta x$.

The two sensors may be placed asymmetrically relative to the position of wheel 4, to compensate for delay in the measurements. For example, if the sensor readings are reported to the controller with a delay of 5 ms, and the vehicle is travelling at a speed of 7.2 km/h, the delay causes the determination of $\Delta Z_{FL}/\Delta x$ to be off by 10 mm. Put differently, during the time it takes for the sensor signals to reach the controller, wheel 4 will have moved 10 mm along path 6. The slope determined by the sensors is not at the location of wheel 4, but 10 mm behind wheel 4.

This error can be compensated by placing the "forward" sensor (i.e., the sensor placed in front of the wheel with respect to the direction of travel) farther from wheel 4, for example by 10 mm if the expected vehicle speed is 7.2 km/h, and by placing the "behind" sensor (i.e., the sensor placed behind the wheel with respect to the direction of travel) closer to the wheel by the same distance, i.e., 10 mm in this example.

If the vehicle is designed to travel in two directions at generally equal speeds, the wheel could be equipped with two sets of sensors, one for operation when the vehicle is traveling in one direction, and a second for operation when the vehicle is traveling in the opposite direction.

If a scanner is used to detect $Z_{FL}(x)$ the scanner can be programmed to detect $Z_{FL}$ at the exact desired locations as determined by the direction and speed of travel of the vehicle.

FIG. 6C shows a method for determining the second derivative of f(x). As compared to the system of FIG. 6B, the system of FIG. 6C has a third sensor, located for example below the axis of wheel 4. The signals of the three sensors can be used to calculate $\Delta^2 Z_{FL}/\Delta x^2$, which is an approximation of f''(x).

Figure 7:
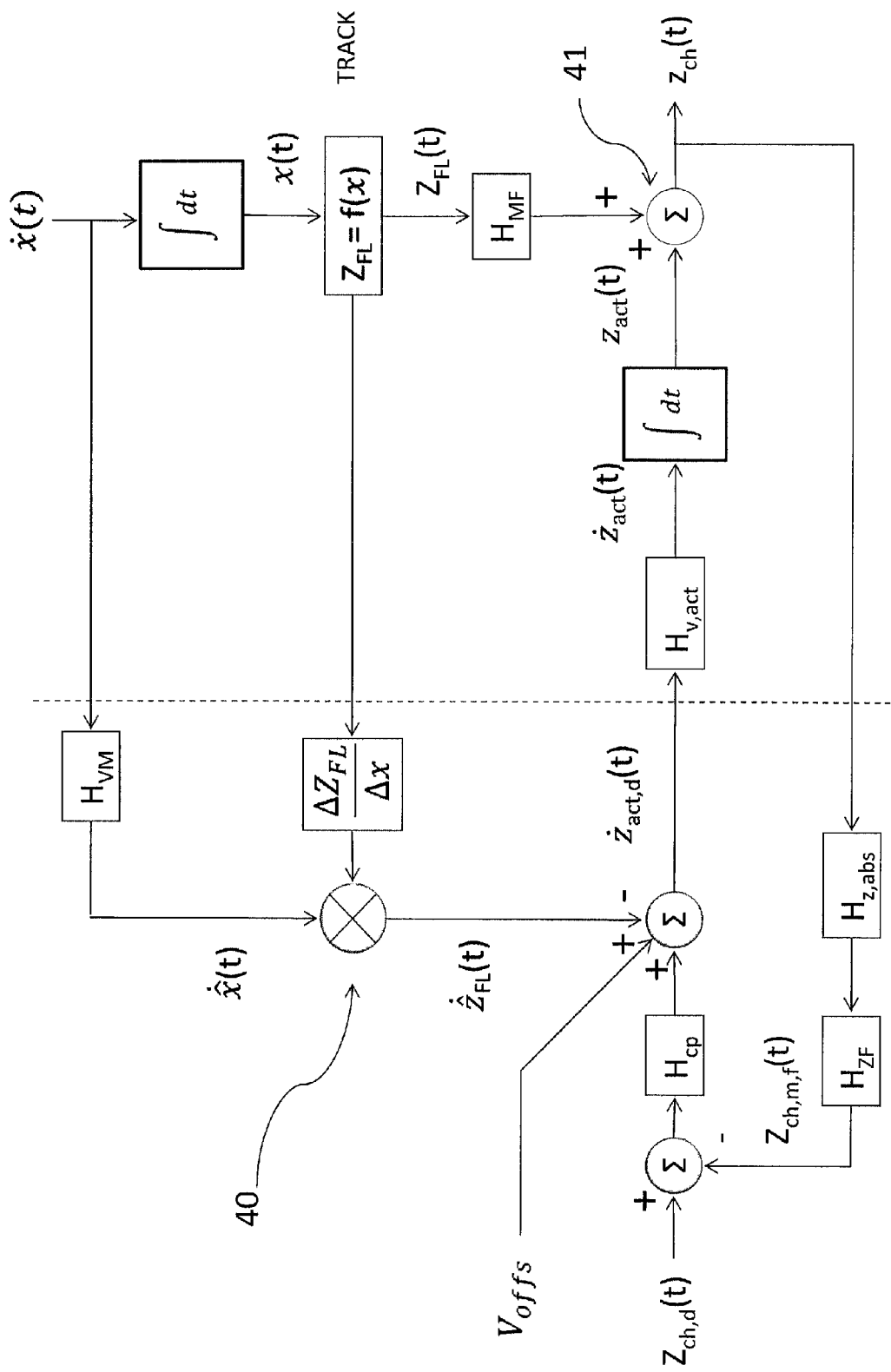
FIG. 7 shows a schematic diagram of an embodiment of a compensation system according to the invention.

FIG. 7 is a schematic diagram of an embodiment of the invention. The diagram relates to a vehicle having one wheel equipped with a measuring system and an actuator. The vehicle may have additional wheels. For example, the vehicle may be a fork lift or a very narrow aisle truck having three wheels or four wheels. In this example, only one of the wheels is provided with pitch and/or roll compensation.

Input variables are the speed of the vehicle which is the first derivative of the vehicle's position along the travel path, $\dot{x}(t)$; and the slope of the floor surface $\Delta Z_{FL}/\Delta x$, which can be measured as explained with reference to FIG. 6B.

Transfer function $H_{VM}$ represents any inaccuracies in the determination of vehicle speed $\dot{x}(t)$. At 40 the two input variables are multiplied with each other to yield the estimated surface speed $\dot{z}_{FL}(t)$. This surface speed can conceptually be seen as a kinematic effect (speed) being exerted on the supporting wheel. The sign of the surface speed is inverted to yield (after correction by the feedback loop explained below) an actuator desired speed $\dot{z}_{act,d}(t)$. A controller controls power provided to an actuator such that the actuator develops speed $\dot{z}_{act}(t)$. Thus, the actuator speed is equal to (disregarding any corrections resulting from the feedback loop) but opposite in sign to the estimated surface speed $\dot{z}_{FL}(t)$.

As the above described system operates without reference to an external benchmark, there is a risk that cumulative errors could result in a systematic deviation from the desired goal. Put differently, the feed forward system described above is potentially subject to "drift." Desirably the system is provided with a feedback loop, to counteract drift. An example of such feedback loop is depicted in the lower portion of FIG. 7.

Actuator speed $\dot{z}_{act}(t)$ is integrated over time to yield $Z_{act}(t)$. The time integral of $\dot{x}(t)$ yields $x(t)$, the position of wheel 4 as a function of time. $H_{MF}$ is a transfer function representing any deviations from a perfectly rigid wheel/suspension combination. In a perfectly rigid system any surface irregularities would be transferred to the chassis without any filtering; in such case the value of $H_{MF}$ would be equal to 1 over the entire frequency range. In real life situations the wheels and suspension are provided with some amount of shock absorption, for example rubber bushings in the wheel actuator, and/or a rubber band around the wheel. Such provisions result in the value of $H_{MF}$ being substantially less than 1 at higher frequencies. It has been found, however, that even in these situations a value of 1 may be adopted for transfer function $H_{MF}$, because the compensation mechanism is designed to compensate vibrations of relatively low frequencies (in the order of 1 or 2 Hz, for example), whereas the shock absorption provisions of the wheel and suspension are designed to absorb vibrations of higher frequencies.

Summation of $Z_{act}(t)$ and $Z_{FL}(t)$ at 41 yield a value for $Z_{CH}(t)$, the vertical position of the chassis at the location of wheel 4, as a function of time. Over time the value of $Z_{CH}$ should be constant. FIG. 2 provides a physical representation of this summation.

The feedback loop contains a measuring device providing a position measurement relative to a frame of reference that is external to the vehicle. In the case of a one-wheeled system this can be an absolute height measurement system, for example comprising a construction laser and a precision measuring laser detector. In a multiple-wheeled system an inclinometer can be used, which conceptually is an electronic carpenter's level. The inclinometer provides a signal that represents the tilt of the chassis relative to a virtual horizontal plane. The time average of the inclinometer reading should be zero, that is, over time the average position of the chassis should be horizontal. Transfer function $H_{ZF}$ filters out high frequency vibrations, for example vibrations having a frequency greater than 0.5 Hz.

Subtraction from the desired position of the chassis, $Z_{ch,d}(t)$, yields the value of any desirable correction. This value is used to correct $\dot{z}_{act,d}(t)$. In this manner the feedback loop corrects any drift that may occur. It will be understood that the feedback loop is much slower than the feed forward system, for example a factor 1000 slower. Essentially, the feedback loop and the feed forward system operate in different frequency bands. This is primarily the result of the controller $H_{CP}$, which acts as a filter, and to a lesser extent to the slow response time of an electronic inclinometer.

In general, the feedback loop comprises an absolute measurement system of some kind. If the position measurement system is fast enough there is no need for a feedforward compensation system.

Figure 8:
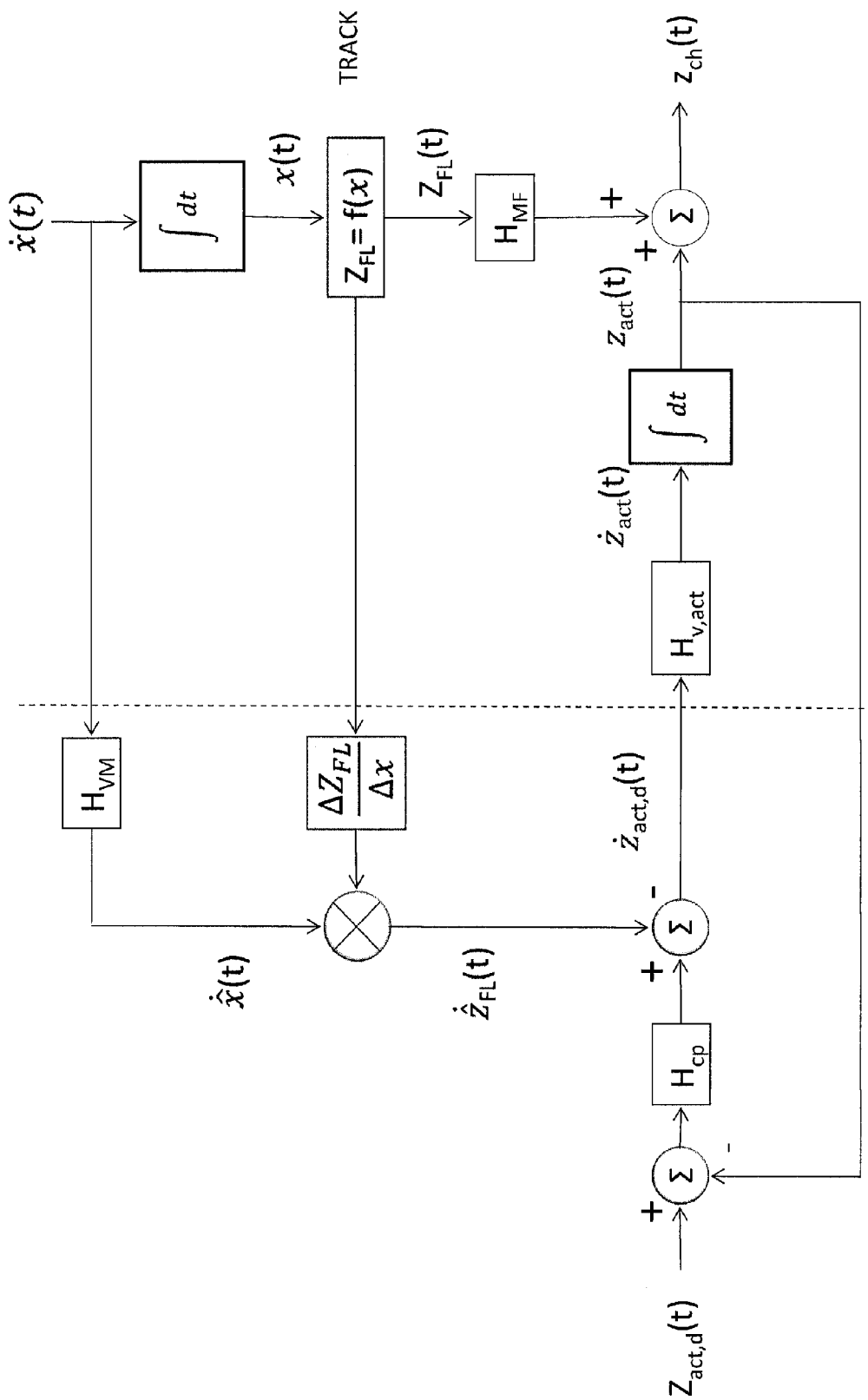
FIG. 8 shows the system of FIG. 7 with an alternate feedback mechanism.

FIG. 8 depicts the system of FIG. 7, with an alternate feedback mechanism. The actuator has a neutral position, halfway its operating range. This is referred to as $Z_{act,d}$, the desired position of the actuator. The feedback loop compares the actual actuator position, $Z_{act}(t)$, with the desired position. Any discrepancy is used to correct actuator speed act $\dot{z}_{act}(t)$. Although it may be technically possible to operate the feedback loop at the same speed as the feed forward circuit, it is not desirable to do so as the drift correction is hierarchically subordinate to the height compensation function (for one-wheeled vehicles) or the roll/pitch compensation function (for multi-wheel vehicles). In general the feedback loop is operated at a speed that is 2 or 3 orders of magnitude slower than the feed forward system, by proper parameterization of $H_{CP}$.

FIG. 9 describes an embodiment having two wheels sharing an axis, wherein both wheels are provided with sensors for detecting surface imperfections, and only one wheel (wheel 1) having a compensation mechanism, such as an actuator. This embodiment is particularly suited for compensating roll movements of a traveling vehicle.

Figure 9A:
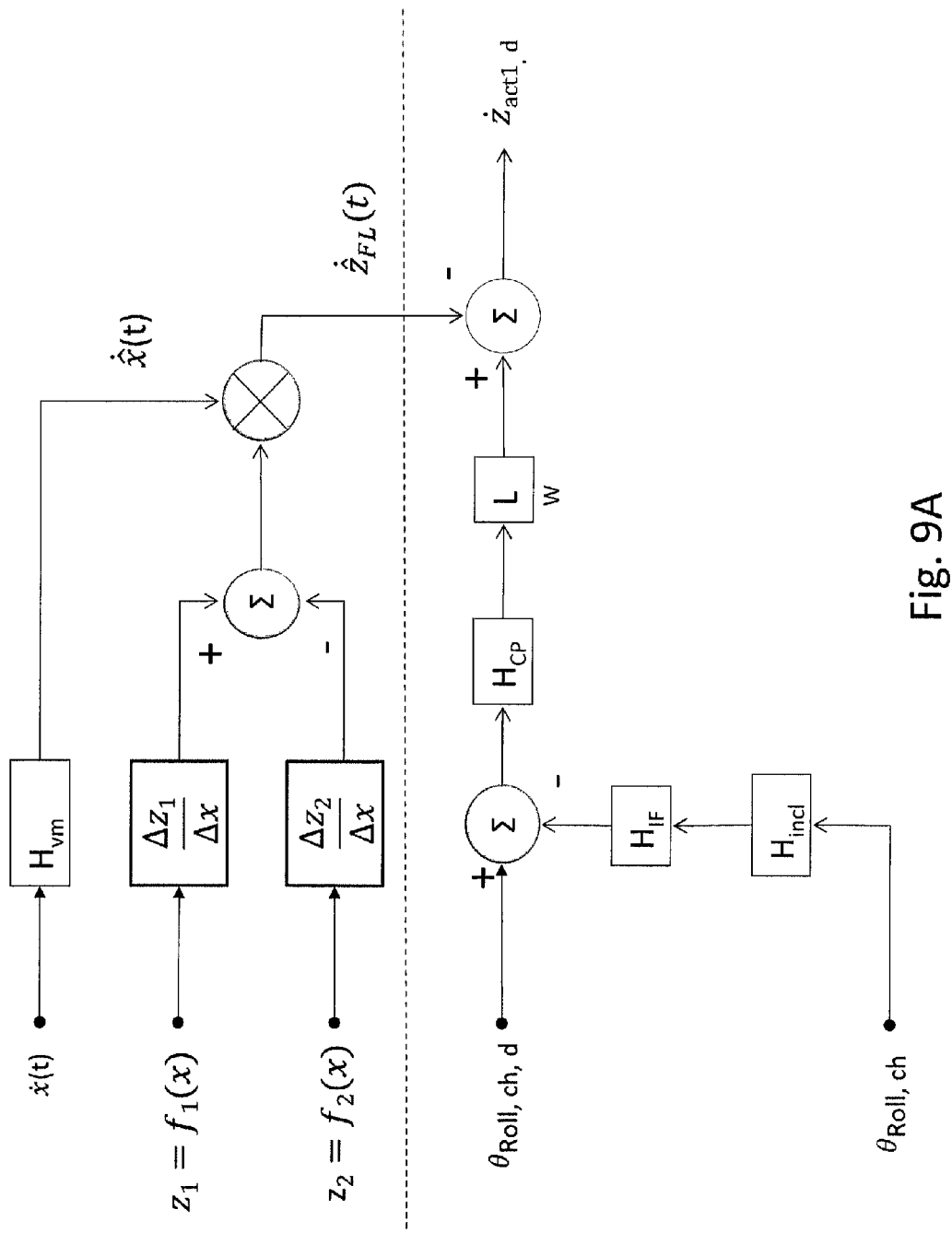
FIG. 9A is a schematic representation of a compensation system with one actuator and two detection means acting on two wheels sharing an axis.

FIG. 9A is a diagrammatic representation of the control mechanism. The portion of FIG. 9A above the dotted line represents the feed forward portion of the control mechanism. Input parameters are $\dot{x}(t)$ (the travel speed of the vehicle); $Z'_1=f'(x_1)=\Delta Z_1/\Delta x_1$, the slope of the floor surface in track 1 at the location of wheel 1; and $Z'_2=f'(x_2)=\Delta Z_2/\Delta x_2$, the slope of the floor surface in track 2 at the location of wheel 2. Roll movement is caused by a difference between $Z'_1$ and $Z'_2$. The difference between $Z'_1$ and $Z'_2$ is multiplied by the truck speed to yield $\hat{z}_{FL}(t)$, which can be considered the net surface speed of the two tracks. After correction for possible drift, this surface speed is compensated by an opposite actuator speed $\dot{z}_{act1,d}(t)$.

The portion of FIG. 9A below the dotted line represents the feedback mechanism. The truck is provided with an inclinometer, which provides input parameter $\theta_{roll,ch}$. The value of this parameter is compared to the desired value, $\theta_{roll,ch,d}$, which is zero. The difference $\Delta\theta$ is reported in rad. Transfer function $H_{CP}$ converts this to rad/s. Block $L_w$ uses the track width (i.e., the lateral distance between wheel 1 and wheel 2) to convert this value to m/s. The latter conversion is the sine of $\Delta\theta$. For small values the sine function can be approximated as a linear function. Summation with $\hat{z}_{FL}(t)$ yields the corrected value for $\dot{z}_{act1,d}(t)$.

Figure 9B:
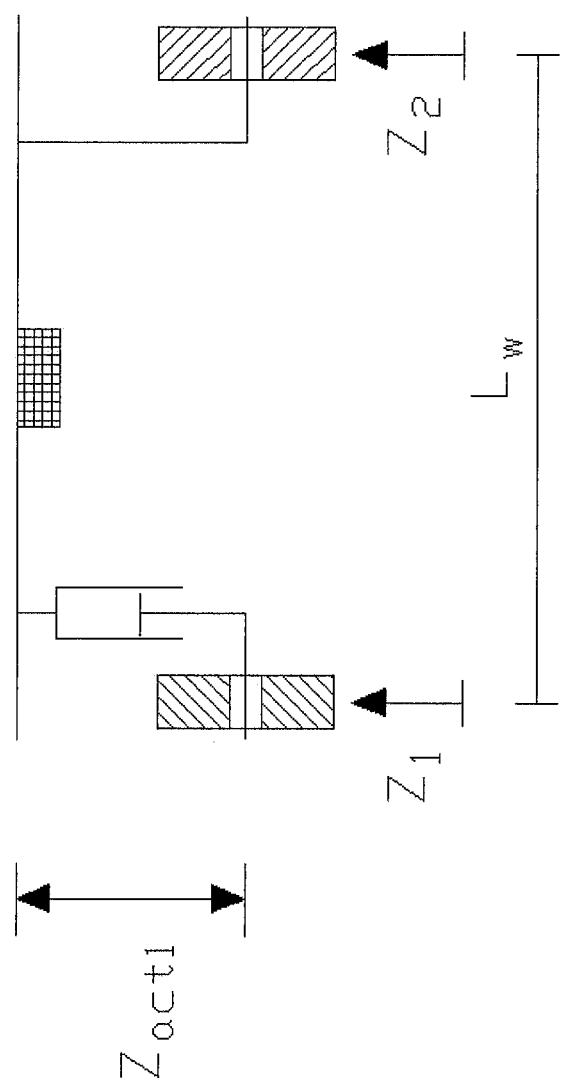
FIG. 9B is a schematic representation of the vehicle of FIG. 9A.

FIG. 9B is a schematic representation of this truck, showing wheel 1 supported by track 1, wheel 2 supported by track 2. Track width $L_w$, and the actuator associated with wheel 1.

Figure 9C:
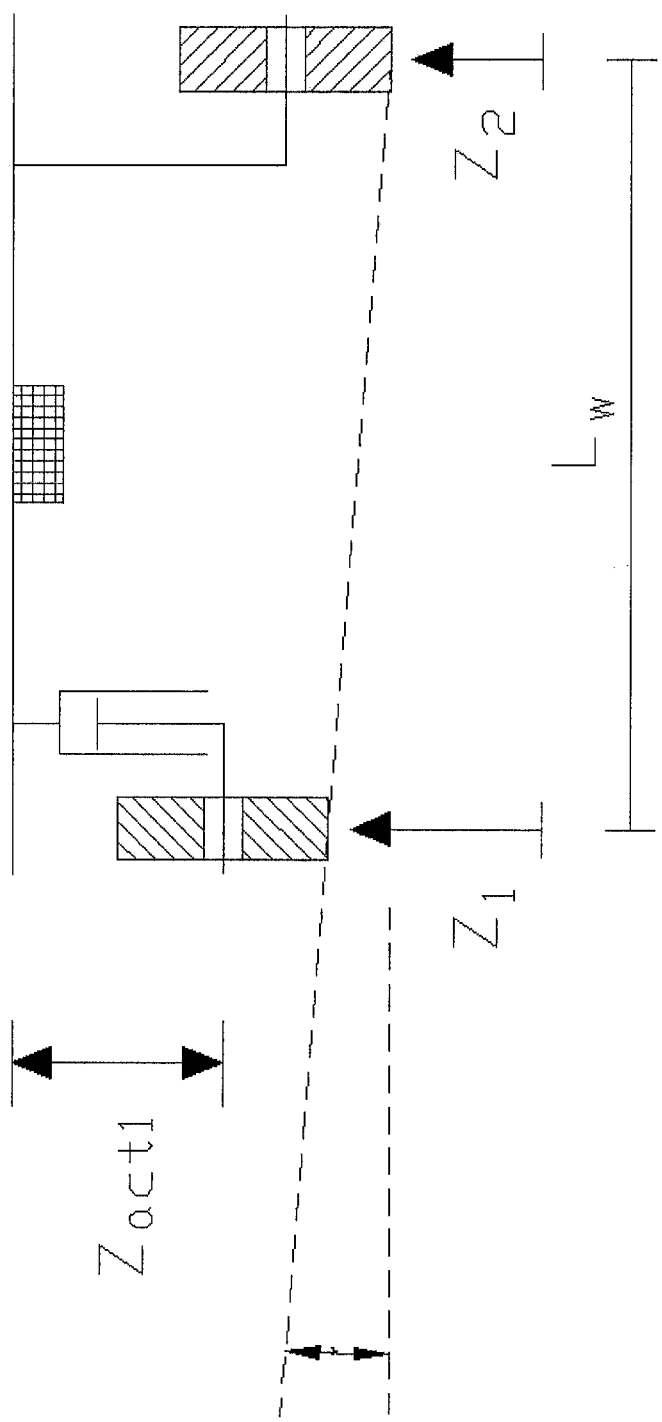
FIG. 9C shows the vehicle of FIG. 9B at a time that one of the wheels encounters a bump in the traveling surface.

FIG. 9C shows the truck of FIG. 9B with wheel 1 encountering a bump, causing the actuator to retract.

As mentioned above, the embodiment of FIG. 9 is particularly suitable for compensating roll movement of the vehicle. This embodiment is suited for situations in which roll movements are of far greater concern than pitch movements. Examples include vehicles that operate in narrow spaces, such as narrow aisle trucks and very narrow aisle trucks.

Figure 10:
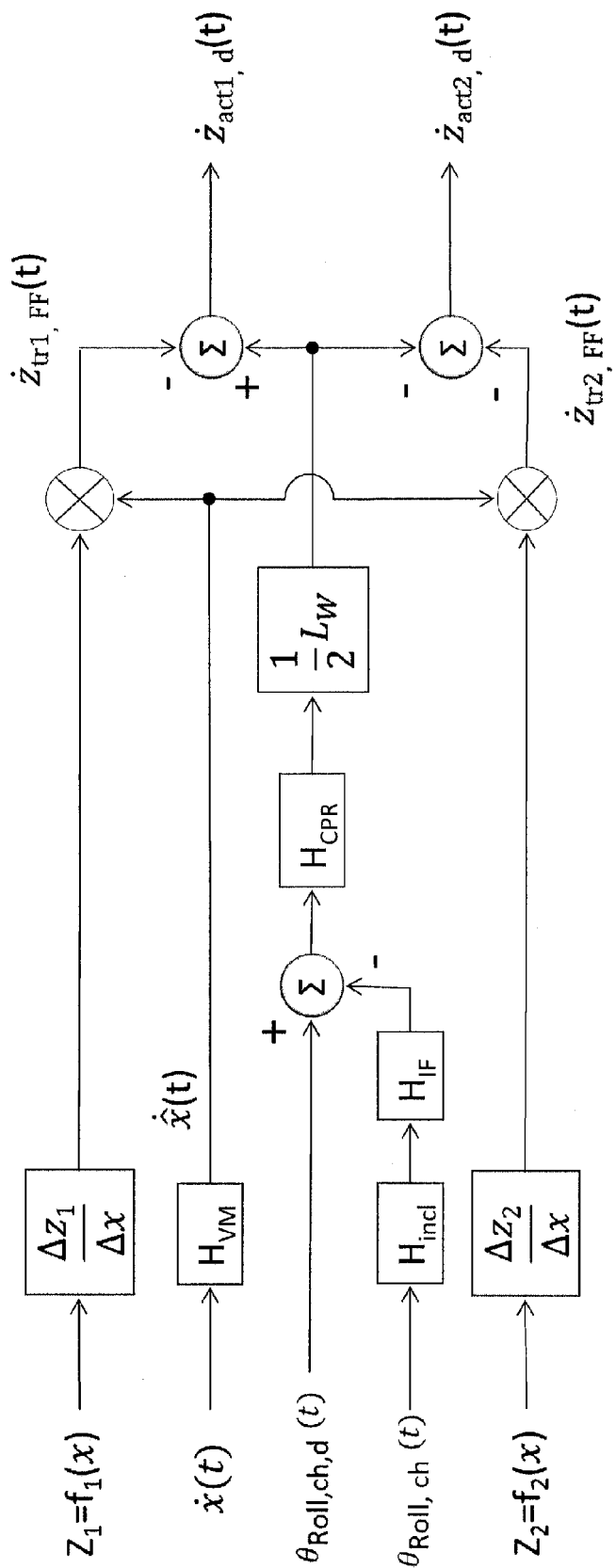
FIG. 10 shows a vehicle similar to that of FIG. 9A, having actuators on both wheels.

FIG. 10 is a diagrammatic representation of the control mechanism of a vehicle having two wheels provided with sensors and an actuator. This vehicle is similar to that of FIG. 9, but is different in that the second wheel also has an actuator. The compensation mechanisms of wheel 1 and wheel 2 operate independently from each other, each compensating for surface irregularities encountered in its respective travel path.

As in FIG. 9, the feedback mechanism comprises an inclinometer, which is used to determine any deviations from the desired roll angel of zero. The correction signal is split evenly between the two actuators, with opposite signs. Like the embodiment of FIG. 9, this embodiment is particularly suited for compensating roll movements, but can also partially compensate pitch movements.

Figure 11:
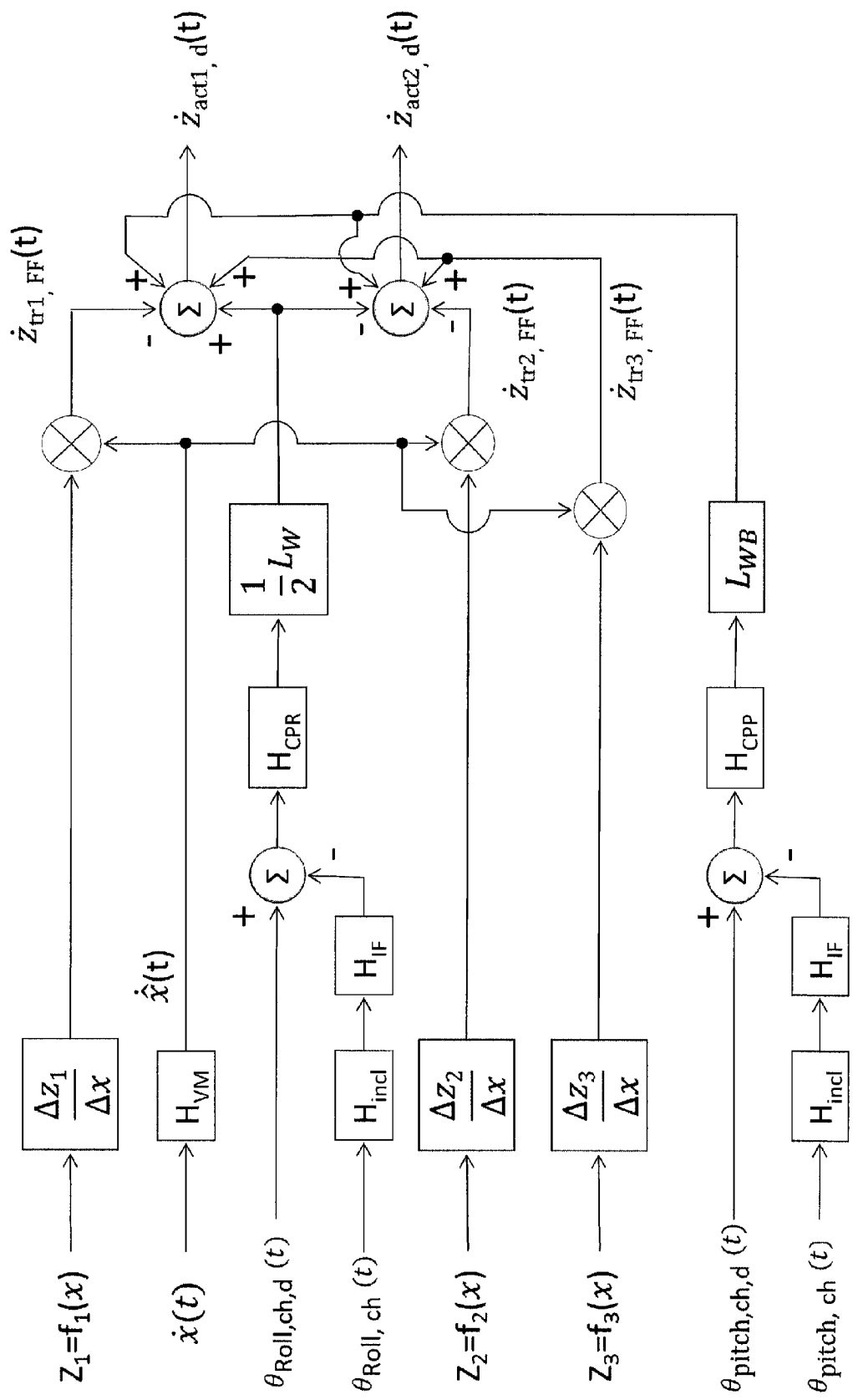
FIG. 11 shows a vehicle similar to that of FIG. 10, with a third wheel having a sensor but no actuator.

FIG. 11 relates to a truck having a first and a second wheel sharing the same axis. As in the embodiment of FIG. 10, wheels 1 and 2 each have a sensor and an actuator. The vehicle of FIG. 11 has a third wheel, on a different axis of wheels 1 and 2. This third wheel may be placed on the longitudinal axis of the vehicle, in case of a three-wheel vehicle. The third wheel has a sensor, but no actuator. Instead, any surface speed encountered by the third wheel is compensated by actuation of the first and second wheels. Note that there is no sign inversion in this case: if the third wheel encounters an upward surface speed, pitch movement compensation is accomplished by imparting equal and upward speeds to the first and second wheels. The effect is the same as when an equal but opposite speed is imparted to the third wheel.

The embodiment of FIG. 11 has a feedback loop to correct for drift. This feedback loop comprises an inclinometer, which reports a pitch angle $\theta_{pitch,ch}$. This value is compared to the desired pitch angle $\theta_{pitch,ch,d}$, which typically is equal to zero. Any deviation is converted to a pitch angle velocity (rad/s), which is converted to a pitch velocity by multiplication with the wheel base $L_{WB}$, i.e., the distance between the axis of the third wheel and the axis shared by the first and second wheels. The outcome is used to correct the signals to the actuators of the first and second wheels. Of course, no sign inversion is applied in this case.

In the foregoing discussion, the finite difference quotient $\Delta z/\Delta x$ is expressed with respect to an absolute reference coordinate system. Since this is difficult to realize in practice it is also possible to measure the finite height difference with respect to a varying reference, e.g. the chassis of the vehicle. The chassis does not necessarily stay perfectly horizontal, especially in the case when there is only a roll compensation implemented. The control schemes of FIGS. 9 and 11 indicate that a varying reference, as e.g. the chassis, is still useful for the purpose of compensating respectively the roll and pitch motion because the technique does not make use of the absolute height difference but of the difference in height differences. As long as the varying reference is the same for all measurement systems installed at the vehicle it is possible to compensate for the roll and pitch body movements.

Beside a pure feedback strategy to compensate for systematic velocity feedforward inaccuracies, e.g. drift, the invention also provides for a learning strategy to estimate some of these inaccuracies. A constant velocity drift can be observed as the average position error over time when implementing a proportional feedback control strategy as transfer function $H_{CP}$. Compensating the drift velocity by the estimated average drift velocity has the advantage that the position error of the controlled system is substantially smaller. Applying this strategy repeatedly over time ensures that the drift is optimally compensated over time and yields a good average position (height) accuracy.

Figure 12:
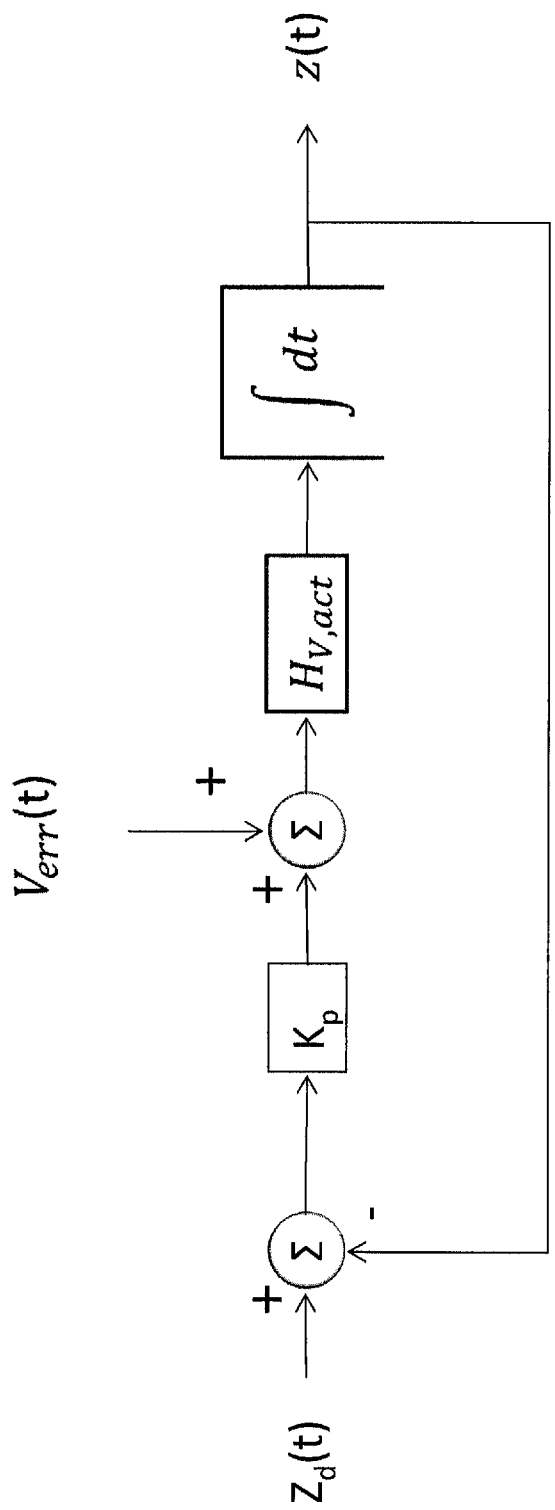
FIG. 12 is a generalized representation of a feedback mechanism for use in a vehicle of the invention.

FIG. 12 presents the simplified scheme of the controlled system. $V_{err}(t)$ represents a velocity disturbance signal, $K_P$ is the proportional feedback controller and $z(t)$ is the controlled position signal (chassis height or actuator position). A person skilled in the art can derive that the steady state position error for a given velocity disturbance is as follows $$\frac{z}{V_{err}}(s \to 0) = \frac{1}{K_p}$$

The steady state velocity disturbance or constant velocity drift is calculated as the observed position error multiplied by the proportional feedback constant. This calculated velocity disturbance can be integrated in the control scheme of FIG. 7 as $V_{offs}$.

In a roll compensated control strategy, a constant velocity drift can be observed as the average misalignment with respect to the horizontal reference measured by an electronic carpenter's level.

Thus, the invention has been described by reference to certain embodiments discussed above. It will be recognized that these embodiments are susceptible to various modifications and alternative forms well known to those of skill in the art. For example, the feedback mechanism may be modified by monitoring and correcting the actuator position, instead of monitoring and correcting a chassis height and/or a roll or pitch angle.

If a vehicle is provided with an inclinometer, the inclinometer reading can be used to compensate any chassis tilt at standstill. In this embodiment a wheel actuator is used to put the chassis of the vehicle in a horizontal position when the vehicle is standing still. In the case of a narrow aisle truck or a very narrow aisle truck such provision increases the loading capacity of the truck. The controller can be programmed to anticipate standstill. For example, when the speed is below a predetermined threshold value, and the vehicle is decelerating, the controller selects a compensation protocol for leveling the chassis, whereas at speeds above the predetermined threshold value the controller selects a protocol for compensating roll and/or pitch. In the latter case the inclinometer may be employed in a feedback loop, as described above. The two different protocols can be selected, for example, by adjusting the control parameters $H_{CP}$ and/or the filter parameters $H_{IF}$.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A vehicle comprising a chassis; at least a first wheel in contact with a traveling surface; a detector for detecting a surface characteristic of the traveling surface; a data processor for calculating from the surface characteristic a vertical component of a first kinematic effect being exerted or about to be exerted on the at least one wheel by the traveling surface; an actuator for exerting a second kinematic effect on the first wheel, said second kinematic effect being equal to or approximately equal to, and opposite in sign, to the first kinematic effect.

2. The vehicle of claim 1 which further comprises a sensor for determining a traveling speed of the vehicle, and wherein the processor uses the traveling speed of the vehicle in calculating the first kinematic effect.

3. The vehicle of claim 1 wherein the first kinematic effect is a velocity or a vertical component of a velocity.

4. The vehicle of claim 1 wherein the first kinematic effect is an acceleration or a vertical component of an acceleration.

5. The vehicle of claim 1 wherein the surface characteristic is a first derivative of a vertical profile of the traveling surface.

6. The vehicle of claim 1 wherein the surface characteristic is a second derivative of a vertical profile of the traveling surface.

7. The vehicle of claim 1 further comprising a feedback mechanism for correcting systematic errors in the first kinematic effect.

8. The vehicle of claim 7 wherein the feedback mechanism comprises a measurement relative to a reference external to the vehicle.

9. The vehicle of claim 1 comprising a second wheel in contact with the traveling surface, and a second detector for detecting a surface characteristic associated with the traveling surface, said second detector being associated with said second wheel.

10. The vehicle of claim 9 further comprising a second actuator acting on said second wheel.

11. The vehicle of claim 9 wherein the first wheel and the second wheel have a common axis.

12. The vehicle of claim 9 comprising a third wheel in contact with the traveling surface, and a third detector for detecting a surface characteristic associated with the traveling surface, said third detector being associated with said third wheel.

13. The vehicle of claim 12 wherein the first wheel and the second wheel have a common axis, and the third wheel has an axis different from the common axis.

14. The vehicle of claim 1 further comprising a safety mechanism for overriding the actuator or actuators.

15. A vehicle comprising a chassis; at least two wheels on opposite sides of the chassis in contact with a traveling surface, each of said two wheels being associated with a detector for detecting a surface characteristic of the traveling surface; a data processor for calculating from the surface characteristics vertical components of primary kinematic effects being exerted or about to be exerted on the at least two wheels; and actuators associated with the at least two wheels for exerting secondary kinematic effects designed to counteract the primary kinematic effects.

16. The vehicle of claim 15 further comprising a feedback mechanism comprising an inclinometer.

17. The vehicle of claim 16 wherein the feedback mechanism generates a correction signal that is split evenly between the two actuators, with opposite signs.

* * * * *